United States Patent
Kalbasi

(10) Patent No.: US 12,452,911 B2
(45) Date of Patent: Oct. 21, 2025

(54) BANDWIDTH PART SWITCHING METHODS AND APPARATUS FOR WIRELESS DEVICES

(71) Applicant: TOYOTA JIDOSHA KABUSHIKI KAISHA, Toyota (JP)

(72) Inventor: Reza Kalbasi, San Diego, CA (US)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/946,702

(22) Filed: Nov. 13, 2024

(65) Prior Publication Data
US 2025/0071806 A1    Feb. 27, 2025

Related U.S. Application Data

(63) Continuation of application No. 18/281,141, filed as application No. PCT/US2022/019343 on Mar. 8, 2022.

(60) Provisional application No. 63/158,943, filed on Mar. 10, 2021.

(51) Int. Cl.
| | |
|---|---|
| *H04W 74/00* | (2009.01) |
| *H04W 74/0808* | (2024.01) |
| *H04W 74/0833* | (2024.01) |
| *H04W 74/0836* | (2024.01) |
| *H04W 74/0838* | (2024.01) |

(52) U.S. Cl.
CPC ..... *H04W 74/006* (2013.01); *H04W 74/0808* (2013.01); *H04W 74/0833* (2013.01); *H04W 74/0836* (2024.01); *H04W 74/0838* (2024.01)

(58) Field of Classification Search
CPC .... H04W 74/00; H04W 74/08; H04W 74/083
See application file for complete search history.

(56) References Cited

U.S. PATENT DOCUMENTS

| | | | |
|---|---|---|---|
| 2020/0053779 A1* | 2/2020 | Jeon | H04W 74/02 |
| 2020/0112484 A1 | 4/2020 | Sun et al. | |
| 2021/0029768 A1* | 1/2021 | Shih | H04W 74/0833 |

(Continued)

FOREIGN PATENT DOCUMENTS

KR    10-2020-0018310 A    2/2020

OTHER PUBLICATIONS

A Mechanism to handle the consistent uplink LBT, 3GPP TSG-RAN WG2 Meeting #106, Reno, USA, May 13-May 17, 2019.

(Continued)

*Primary Examiner* — Kashif Siddiqui
(74) *Attorney, Agent, or Firm* — Finnegan, Henderson, Farabow, Garrett, and Dunner, LLP

(57) ABSTRACT

The invention includes receiving, by a user equipment (UE), a configuration message indicating one or more frequency bands for transmitting a radio signal and determining, by the UE, a subset of the one or more frequency bands; the UE then performs a listen before talk (LBT) operation on each frequency band of the subset of the one or more frequency bands and the UE transmits a radio signal in at least one of the frequency bands of the subset. The transmitting can include transmitting at least one of a random access request, an information data signal or a control signal. The determining can includes determining a bandwidth part (BWP) in the frequency bands of the subset, wherein the BWP spans across at least one of the frequency bands of the subset. The UE can select the BWP for the transmission of the radio signal.

5 Claims, 25 Drawing Sheets

(56) References Cited

U.S. PATENT DOCUMENTS

2021/0144760 A1* 5/2021 Ozturk .................. H04W 76/19
2021/0168862 A1* 6/2021 Murray ............. H04W 74/0816
2021/0235487 A1   7/2021 Park

OTHER PUBLICATIONS

Wideband operation for NA-unlicensed, 3GPP TSG RAN WG2 Meeting #105, Athens, Greece, Feb. 25-Mar. 1, 2019.
Non Final Office Action issued in U.S. Appl. No. 18/281,141, dated Apr. 2, 2025.

* cited by examiner

| Transport channel | Physical channel | | | |
|---|---|---|---|---|
| | PDSCH | PDCCH | PBCH |
| BCH | | | X |
| PCH | X | | |
| DL-SCH | X | | |

FIG. 4A

| Transport channel | Physical channel | | | |
|---|---|---|---|---|
| | PUSCH | PUCCH | PRACH |
| UL-SCH | X | | |
| RACH | | | X |

FIG. 4B

| Physical Signal | DM-RS | PT-RS | PRS | CSI-RS | PSS | SSS | SRS |
|---|---|---|---|---|---|---|---|
| DL | x | x | x | x | x | x | |
| UL | x | x | | | | | x |

FIG. 6

MIB

*cellBarred*
Value barred means that the cell is barred

*dmrs-TypeA-Position*
Position of (first) DM-RS for downlink

*intraFreqReselection*
Controls cell selection/reselection to intra-frequency cells when the highest ranked cell is barred, or treated as barred by the UE

*pdcch-ConfigSIB1*
Determines a common ControlResourceSet(CORESET), a common search space and necessary PDCCH parameters. If the field ssb-SubcarrierOffset indicates that SIB1 is absent, the field pdcch-ConfigSIB1 indicates the frequency positions where the UE may find SS/PBCH block with SIB1 or the frequency range where the network does not provide SS/PBCH block with SIB1.

*sub-SubcarrierOffset*
frequency domain offset between SSB and the overall resource block grid in number of subcarriers. For operation with shared spectrum channel access, this field is used also for deriving the QCL relationship between SS/PBCH blocks in a serving cell. The value range of this field may be extended by an additional most significant bit encoded within PBCH as specified in TS 38.213.

*subCarrierSpacingCommon*
subcarrier spacing for SIB1, Msg.2/4 for initial access, paging and broadcast SI-messages. If the UE acquires this MIB on an FR1 carrier frequency, the values scs15or60 corresponds to 15 kHz and the value scs30or120 corresponds to 30 kHz. If the UE acquires this MIB on an FR2 carrier, the values scs15or60 corresponds to 60 kHz and the values scs30or120 corresponds to 120 kHz.

*systemFrameNumber*
The 6 most significant bits (MSB) of the 10-bit System Frame Number (SFN). The 4 LSB of the SFN are conveyed in the PBCH transport block as part of channel coding (i.e. outside the MIB encoding), 10-bit System Frame Number (SFN). The 4 LSB of the SFN

*bwp-subband_list*
Identifies the subbands IDs to UE(s).

FIG. 15

| ServingCellConfigCommon |
|---|
| channelAccessMode If present, this field indicates which channel access procedures to apply for operation with shared spectrum channel access |
| dmrs-TypeA-Position Position of (first) DM-RS for downlink |
| downlinkConfigCommon The common downlink configuration of the serving cell, including the frequency information configuration and the initial discoveryBurstWindowLength |
| longBitmap Bitmap when maximum number of SS/PBCH blocks per half frame equals to 64 |
| lte-CRS-ToMatchAround Parameters to determine an LTE CRS pattern that the UE shall rate match around |
| mediumBitmap it map when maximum number of SS/PBCH blocks per half frame equals to 8 |
| n-TimingAdvanceOffset The N_TA-Offset to be applied for all uplink transmissions on this serving cell. If the field is absent, the UE applies the value defined for the duplex mode and frequency range of this serving cell. |
| rateMatchPatternToAddModList Resources patterns which the UE should rate match PDSCH around. The UE rate matches around the union of all resources indicated in the rate match patterns. Rate match patterns defined here on cell level apply only to PDSCH of the same numerology |
| semiStatic-ChannelAccessConfig The parameters for semi-static channel access |
| shortBitmap Bitmap when maximum number of SS/PBCH blocks per half frame equals to 4 e. |
| SS-PBCH-BlockPower Average EPRE resources elements that carry secondary synchronization signals in dBm that the NW used for SSB transmission |
| ssb-periodicityServingCell The SSB periodicity in ms for the rate matching purpose. If the field is absent, the UE applies the value ms5. |
| ssb-PositionQCL Indicates the QCL relationship between SSB positions for this serving cell |

*ssb-PositionQCL* Indicates the QCL relationship between SSB positions for this serving cell

*ssb-PositionsInBurst*
For operation in licensed spectrum, indicates the time domain positions of the transmitted SS-blocks in a half frame with SS/PBCH blocks as. The first/leftmost bit corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. The network configures the same pattern in this field as in the corresponding field in *ServingCellConfigCommonSIB*.

*ssbSubcarrierSpacing* Subcarrier spacing of SSB. Only the values 15 kHz or 30 kHz (FR1), and 120 kHz or 240 kHz (FR2) are applicable.

*supplementaryUplinkConfig* The network configures this field only if *uplinkConfigCommon* is configured. If this field is absent, the UE shall release the *supplementaryUplinkConfig* and the *supplementaryUplink* configured in *ServingCellConfig* this serving cell, if configured.

*tdd-UL-DL-ConfigurationCommon* A cell-specific TDD UL/DL configuration

*bwp-subaband_list* indicates the subbands to UE(s)

BANDWIDTH PART SWITCHING METHODS AND APPARATUS FOR WIRELESS DEVICES

CROSS-REFERENCE TO RELATED APPLICATIONS

This application is a continuation of U.S. application Ser. No. 18/281,141 ("national stage application"), which is a national stage of International Application No. PCT/US2022/019343, filed Mar. 8, 2022 ("international application"), and is based upon and claims priority under 35 USC § 119 (c) from U.S. Provisional Patent Application No. 63/158,943, filed on Mar. 10, 2021 ("provisional application"); the content of the national stage, international, and provisional applications is incorporated herein by reference.

BACKGROUND OF THE INVENTION

The present invention is directed to 5G, which is the $5^{th}$ generation mobile network. It is a new global wireless standard after 1G, 2G, 3G, and 4G networks. 5G enables networks designed to connect machines, objects and devices.

The present invention is more specifically directed to a bandwidth part (BWP) switching mechanism for a user equipment (UE) with enhanced signaling schemes transmitted by a base station to the UE, or to a group of UEs, identifying one or more frequency bands. In an embodiment, the UE can select a subset of the one or more frequency bands and determine a frequency band in the subset the of one or more frequency bands to utilize in transmitting information data to a base station (BS).

SUMMARY OF THE INVENTION

In an embodiment, the invention provides a method of data transmission that includes receiving, by a user equipment (UE), a configuration message indicating one or more frequency bands for transmitting a radio signal and determining, by the UE, a subset of the one or more frequency bands; the UE then performs a listen before talk (LBT) operation on each frequency band of the subset of the one or more frequency bands and the UE transmits a radio signal in at least one of the frequency bands of the subset. The transmitting can include transmitting at least one of a random access request, an information data signal or a control signal. The determining can includes determining a bandwidth part (BWP) in the at least one of the frequency bands of the subset, wherein the BWP spans across the at least one of the frequency bands of the subset; and selecting the BWP for the transmission of the radio signal.

The bandwidth part (BWP) may include: a first part for transmitting the random access request; and a second part for transmitting the information data and/or the control signal. The transmitting may include transmitting the random access request in the first part the bandwidth part (BWP) and transmitting the information data signal and/or control signal in the second part of the BWP. The configuration message may include an identification that specifies bandwidth and location of each of the one or more frequency bands of the subset. The configuration message may be received via a Radio Resource Layer (RRC) protocol, a dedicated user equipment (UE) specific signaling and/or via a downlink control information (DCI) message that includes an identification that specifies bandwidth and a location of each of the one or more frequency bands of the subset.

Preferably, the user equipment (UE) is positioned in a cell of a wireless network and the configuration message is received via a common signaling shared by the UE and other UEs in the cell of the wireless network. The downlink control information (DCI) message is specific to the user equipment (UE).

In an embodiment, the invention presents a method of data transmission that includes determining, by a base station, a subset of a plurality of available frequency bands, transmitting, by the base station, a configuration message indicating the subset of the plurality of available frequency bands for receiving a radio signal by the base station, monitoring, by the base station, the subset of the plurality of the available frequency bands and detecting, by the base station, a radio signal including a random access request, information data, and/or control signaling from a user equipment (UE) in at least one frequency band of the subset of available frequency bands.

The method may further include measuring a key performance indicator (KPI) in each of the available frequency bands and determining the subset of the plurality of available frequency bands based on a quality of the KPI indicators. The method may further include performing a listen before talk (LBT) operation in each of the available frequency bands and determining the subset of the plurality of available frequency bands based on a successful result of the in each of the available frequency bands. The configuration message may include an identification specifying bandwidth and location of one or more frequency bands in the subset.

Preferably, the configuration message is transmitted via a Radio Resource Layer (RRC) protocol, a user equipment (UE)-specific, dedicated signaling to the UE, a common signaling to a group of user equipments (UEs) located in a cell of a wireless network, wherein the common signaling is shared between the group of UEs and/or a downlink control information (DCI) message that includes an identification that specifies bandwidth and location of each of one or more frequency bands of the subset. The DCI message is specific to the user equipment (UE).

In an embodiment, the invention provides a user equipment (UE) including a transceiver configured to receive a configuration message indicating one or more frequency bands for transmitting a radio signal and a processor in communication with transceiver and configured to: perform a listen before talk (LBT) operation on each frequency band of the one or more frequency bands and determine at least one subset frequency band of the one or more frequency bands. In that case, the transceiver is further configured to transmit the radio signal in the at least one subset frequency band of the one or more frequency bands.

In an embodiment, the invention provides a base station including a processor configured to determine a subset of one or more frequency bands and a transceiver in communication with the processor and configured to: a) transmit a configuration message indicating the subset of the one or more frequency bands, b) monitor the subset of the one or more frequency bands and c) detect a radio signal including a random access request, information data, and control signaling from a user equipment (UE) in the one or more frequency bands of the subset.

In an embodiment, the invention provides a non-transitory computer-readable medium having program code recorded, where the program code includes code for controlling a user equipment (UE) to which a part of the program code is operational to receive a configuration message indicating one or more frequency bands for transmitting a radio signal, code for controlling the UE to determine a subset of the one or more frequency bands, code for controlling the UE to perform a listen before talk (LBT) operation on each frequency band of the subset of the one or more frequency bands and code for controlling the UE to transmit a radio signal in at least one frequency band of the subset of the one or more frequency bands.

In an embodiment, the invention provides a non-transitory computer-readable medium having program code recorded, the recorded program code including code for controlling a base station to which a part of the program code is operational to determine a subset of a plurality of frequency bands for transmitting and/or receiving a radio signal, code for controlling the base station to transmit a configuration message indicating the subset of the plurality of frequency bands for receiving a radio signal, code for controlling the base station to monitor the subset of the plurality of frequency bands and code for controlling the base station to detect a radio signal including a random access request, information data, control signaling from a UE in at least one of the subset of the plurality of frequency bands.

BRIEF DESCRIPTION OF THE DRAWINGS

FIG. 3A and FIG. 3B show example mappings between logical channels and transport channels in downlink and uplink, respectively, according to some aspects of some of various exemplary embodiments of the present disclosure.

FIG. 4A and FIG. 4B show example mappings between transport channels and physical channels in downlink and uplink respectively, according to some aspects of some of various exemplary embodiments of the present disclosure.

FIG. 6 shows example physical signals in downlink and uplink according to some aspects of some of various exemplary embodiments of the present disclosure.

FIG. 15 is a tabular representation of an exemplary Master information Block (MIB) similar to MIB specified in 3GPP resources.

FIGS. 16A-16B are tabular representations of an exemplary Information Element (IE) SIB1 similar to IE SIB1 specified in 3GPP resources.

DETAILED DESCRIPTION OF THE INVENTION

Figure 1:
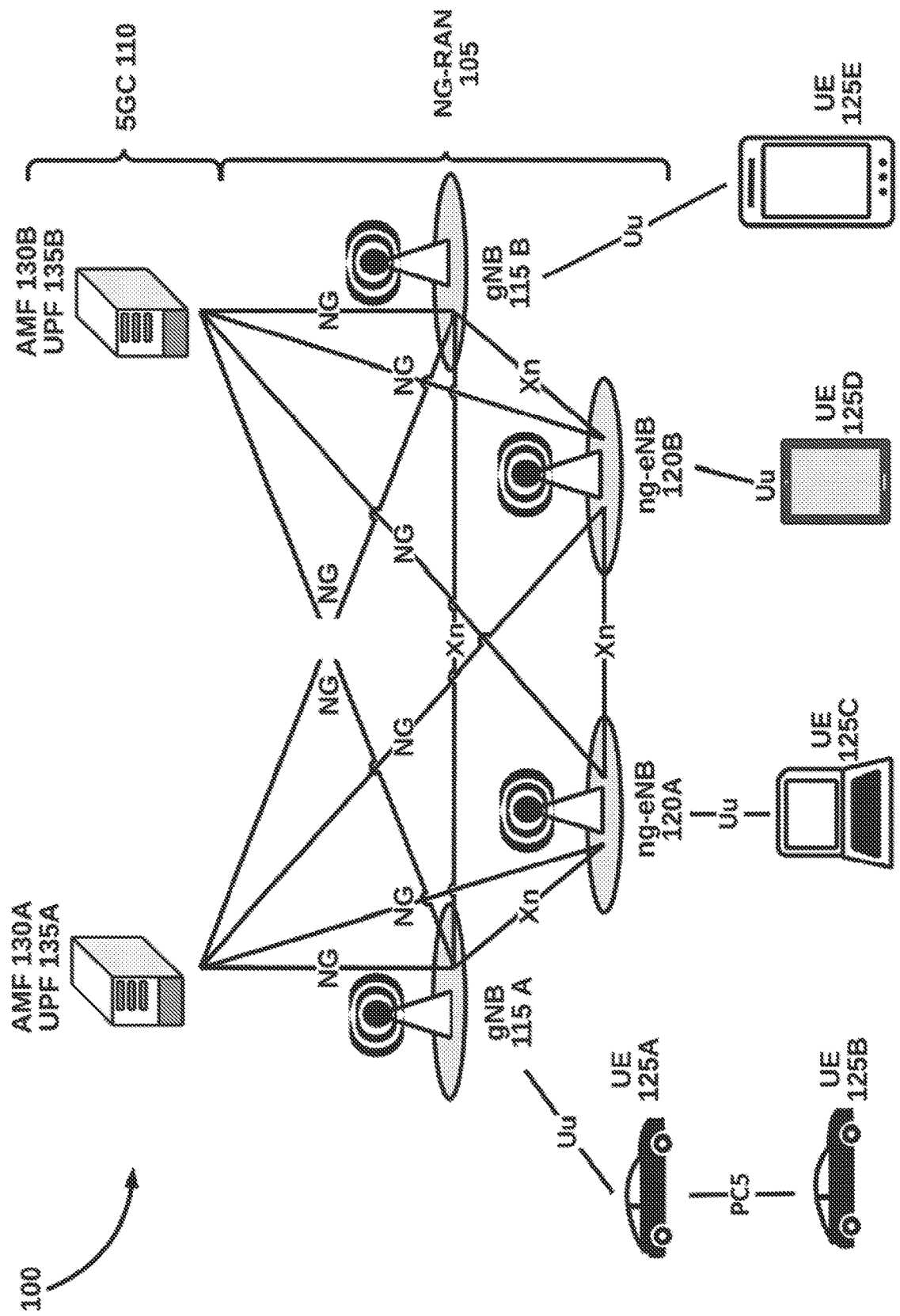
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (IoT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IoT (IIOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink (DL) and the direction from the UE 125 to the base station (e.g., gNB 115 or ng-eNB 120) may be referred to as uplink (UL).

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing & forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
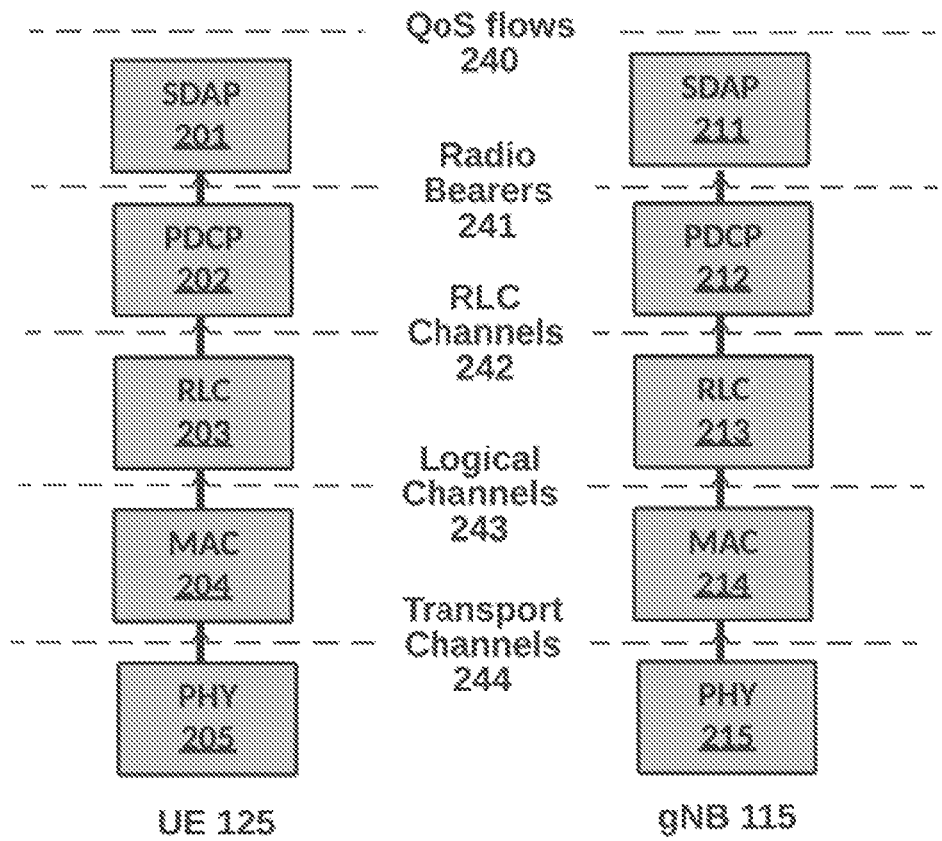
FIG. 2A and FIG. 2B show examples of radio protocol stacks for user plane and control plane, respectively, according to some aspects of some of various exemplary embodiments of the present disclosure.
Figure 2B:
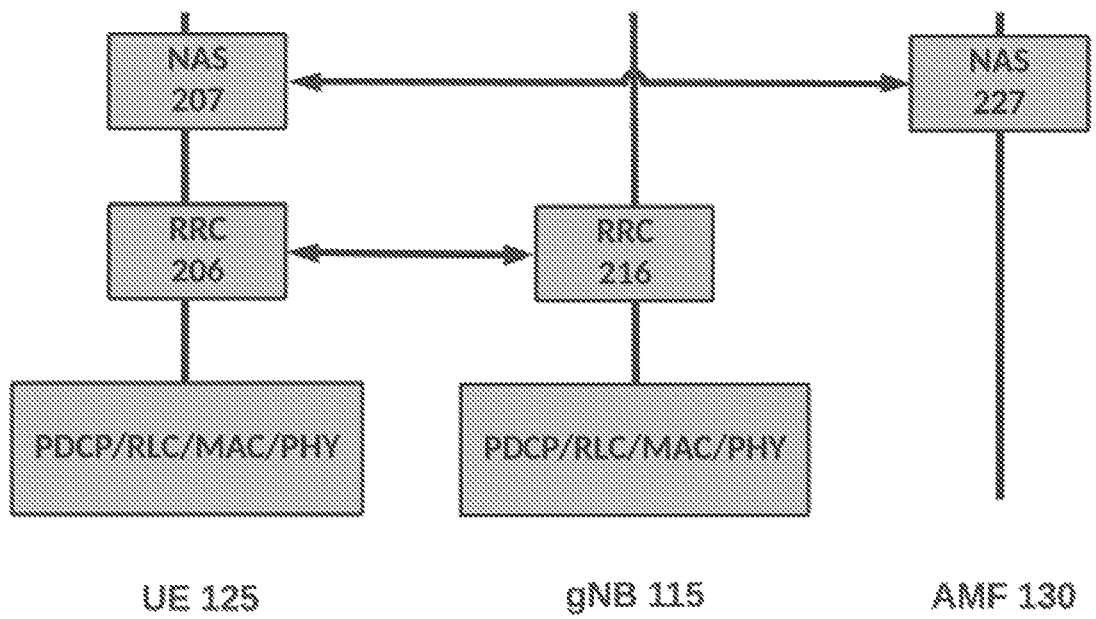

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology (ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

Figures 3A, 3B:
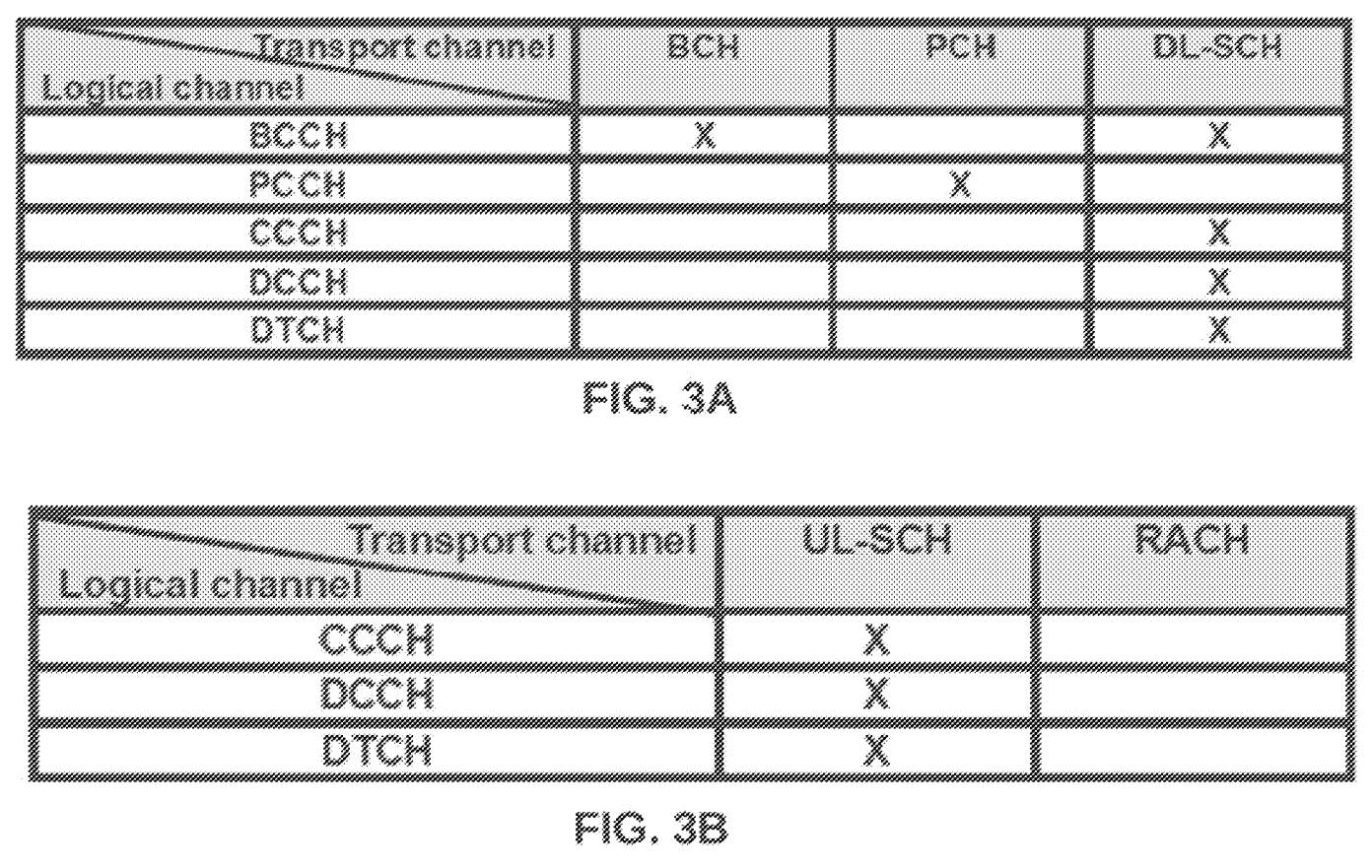

FIG. 3A, FIG. 3B show example mappings between logical channels and transport channels in downlink and uplink, respectively, according to some aspects of some of various exemplary embodiments of the present disclosure. Different kinds of data transfer services may be offered by MAC. Each logical channel type may be defined by what type of information is transferred.

Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink.

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by:

support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

FIG. 4A, FIG. 4B show example mappings between transport channels and physical channels in downlink and uplink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

Figure 5A:
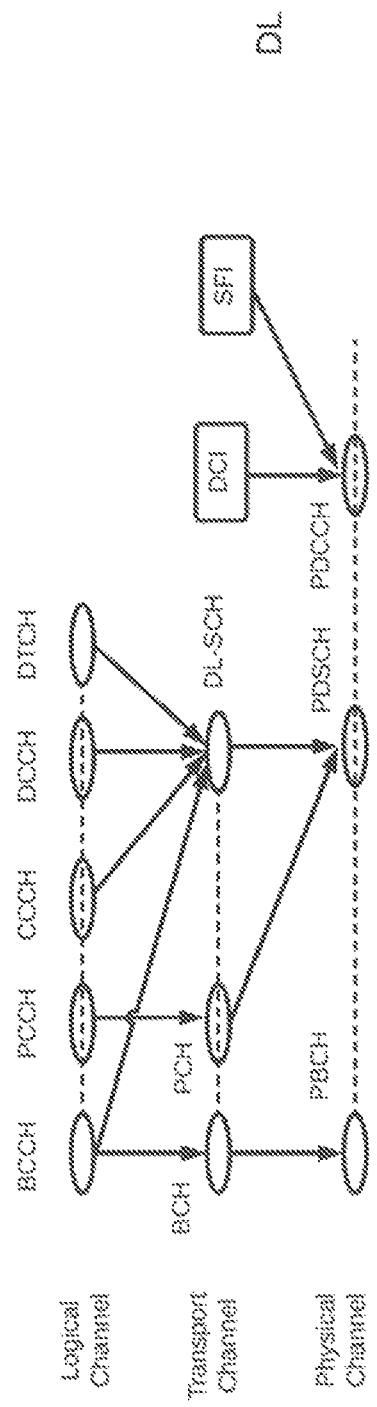
FIG. 5A and FIG. 5B show examples mappings between logical channels, transport channels, and physical channels in downlink and uplink, respectively, according to some aspects of some of various exemplary embodiments of the present disclosure.
Figure 5B:
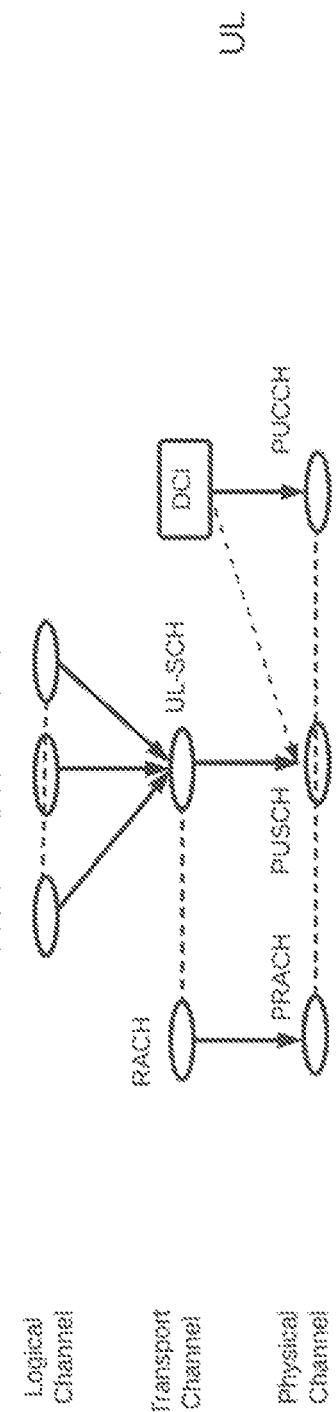

FIG. 5A, FIG. 5B show examples mappings between logical, transport and physical channels in downlink and uplink, respectively, according to some aspects of some of various exemplary embodiments of the present disclosure. The DL logical, transport and physical channels transmit data and control information from a base station (e.g., gNB 115 A, ng-eNB A120) to a UE (e.g., UE 125A UE 125 C) as described previously in FIGS. 3, 4. The UL logical, transport and physical channels transmit data and control information from a UE (e.g., UE 125A UE 125 C) to a base station (e.g., gNB 115 A, ng-eNB A120) as described previously in FIGS. 3, 4.

As FIG. 5A illustrates, the logical channels, BCCH, CCH, DCCH and DTCH may be mapped to the transport channel DL-SCH, and the transport channel DL-SCH may be mapped to PDSCH. The logical channel BCCH may also be mapped to the transport channel BCH, and the transport channel BCH may be mapped to the physical channel PBCH. The logical channel PCCH may be mapped to the transport channel PCH, and the transport channel PCH may be mapped to the physical channel PDSCH.

The downlink control information (DCI) may be mapped to the physical channel PDCCH. The DCI may include scheduling information for the UL or DL data and other control information for a UE or a group of UEs. The DCI message may include detailed information for a UE such as number of resource blocks, resource allocation type, modulation scheme, transport block, redundancy version, coding rate, HARQ feedback, transmit power control, etc. The DCI message bits may be encoded by a forward error correction (FEC) coding scheme (e.g., convolutional), and may be attached by a cyclic redundancy check (CRC). The CRC allows UE to detect presence of error in the encoded DCI message bits. After the CRC is attached, the CRC bits may be scrambled by a radio network temporary identifier (RNTI). The RNTI may enable a UE to detect the DCI for its unicast data and distinguish sets of DCIs with different purposes that have the same payload size.

In addition to DCI, Slot format indicator (SFI) may be also mapped to the physical channel PDCCH. The PDCCH inform the UE how each of symbols within a single slot is used. For instance, it may define which symbols in a frame are used for uplink and which symbols are used for DL.

As FIG. 5B illustrates, the logical channels CCCH, DCC, and DTCH may be mapped to the transport channel UL-SCH, and the transport channel UL-SCH may be mapped to the physical channel PUSCH. The transport channel RACH may be mapped to the physical channel PRACH. As shown, in uplink the DCI may be mapped to physical channels PUCCH and/or PUSCH.

FIG. 6 shows example physical signals in downlink and uplink according to some aspects of some of various exemplary embodiments of the present disclosure. The Demodulation Reference Signal (DM-RS) may be used in downlink, and uplink and may be used for channel estimation. DM-RS is a UE-specific reference signal and may be transmitted together with a physical channel in downlink or uplink, and may be used for channel estimation and coherent detection of the physical channel. The Phase Tracking Reference Signal (PT-RS) may be used in downlink or uplink, and may be used for tracking the phase and mitigating the performance loss due to phase noise.

The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS.

Figure 7:
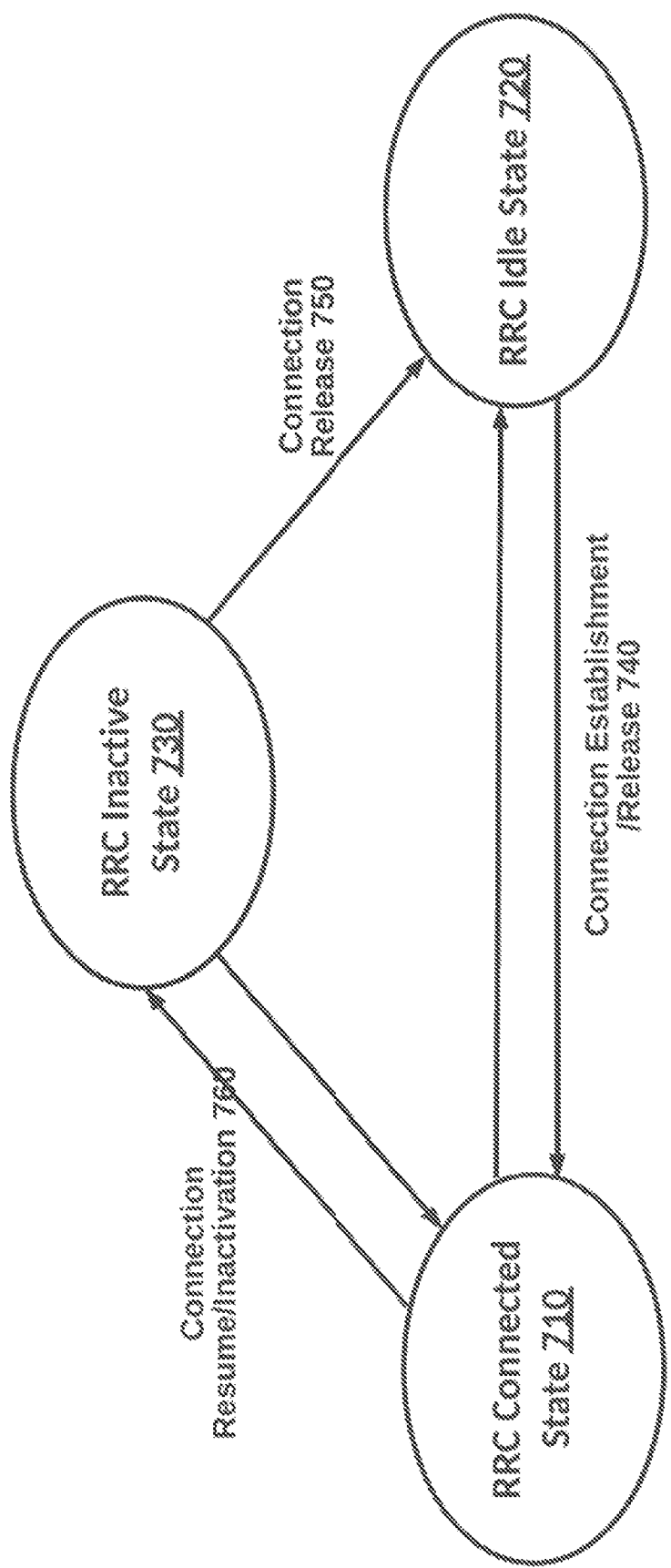
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
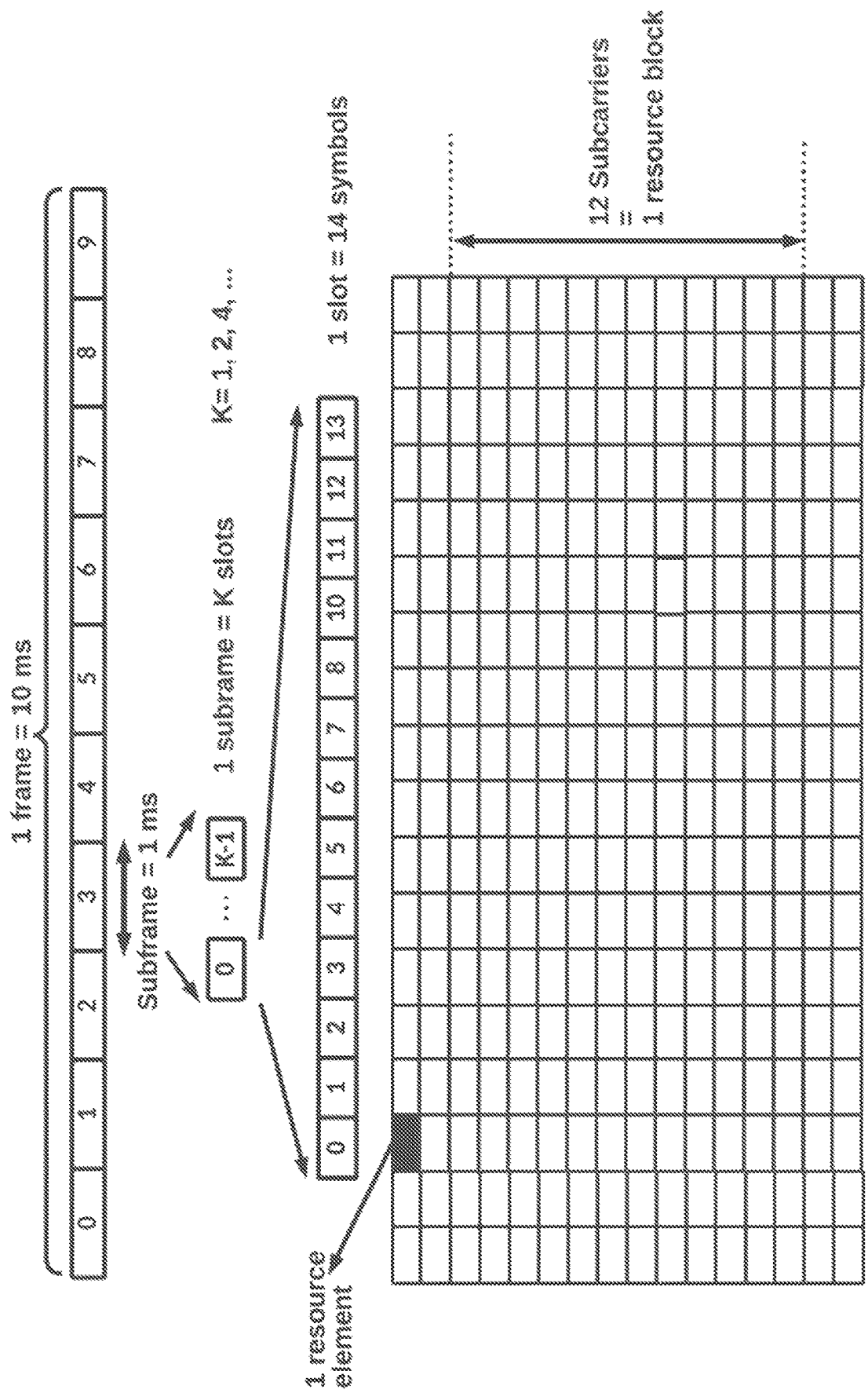
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink transmissions may be organized into frames with 10 ms duration, consisting of ten 1 ms subframes. Each subframe may consist of 1, 2, 4, ... slots, wherein the number of slots per subframe may depend of the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
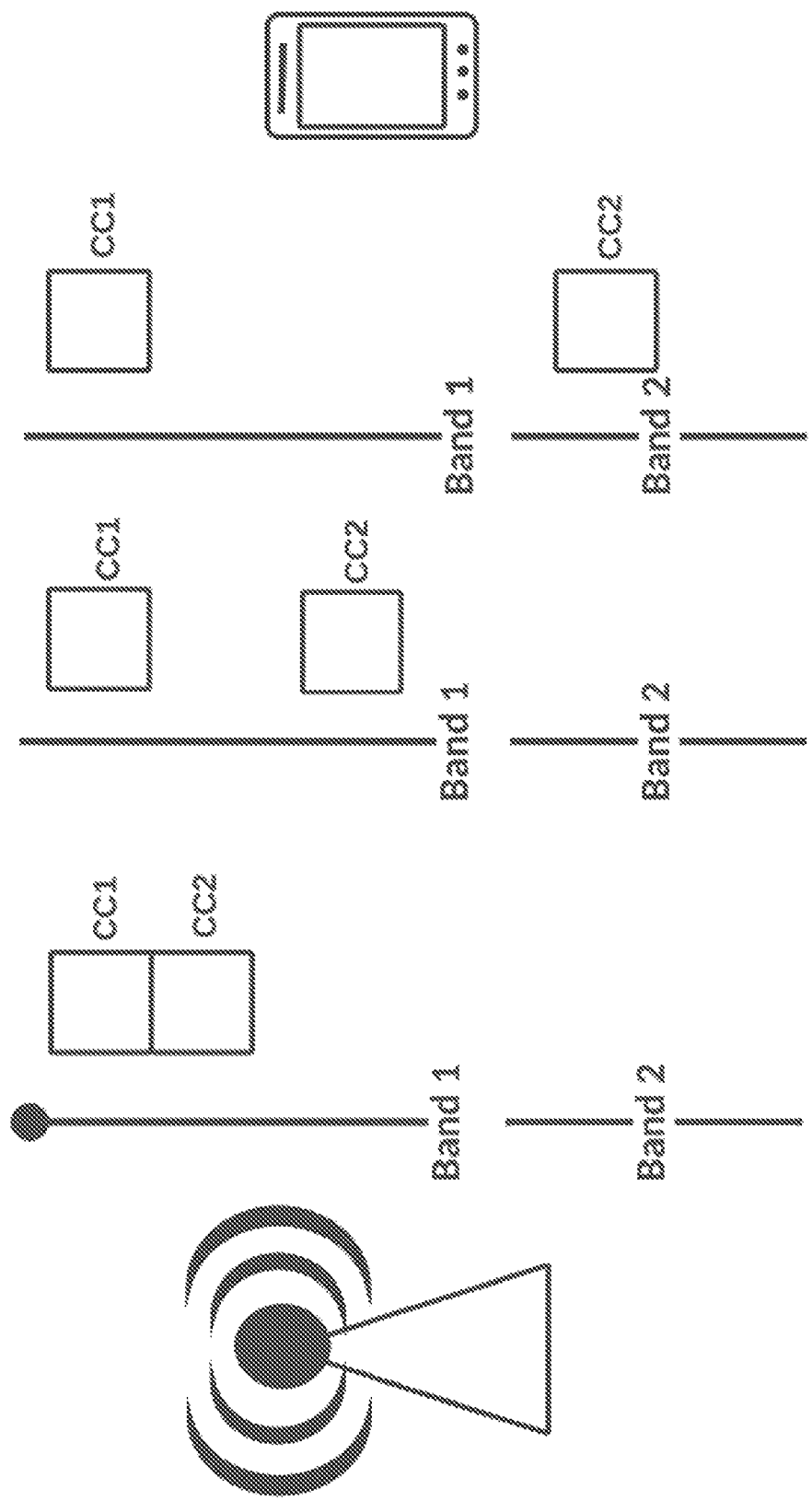
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information.

Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
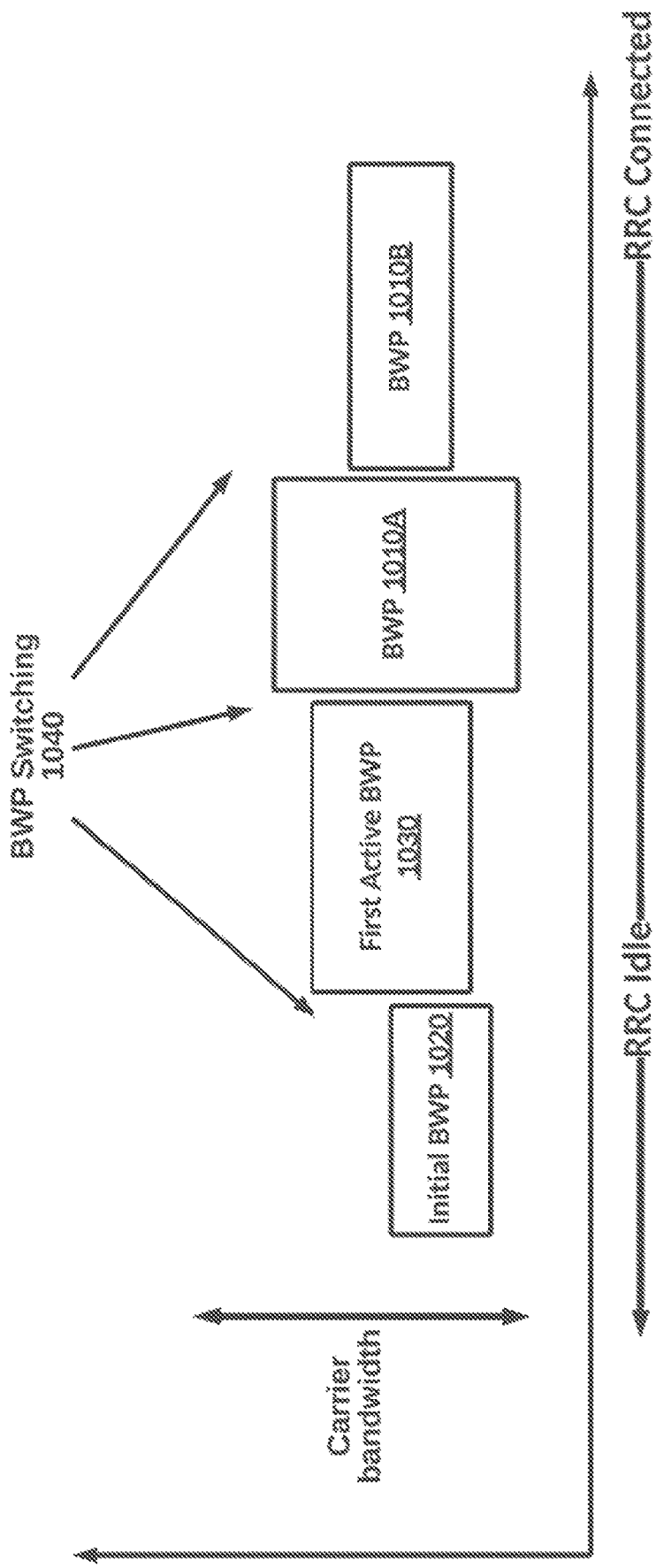
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g. to shrink during period of low activity to save power); the location may move in the frequency domain (e.g. to increase scheduling flexibility); and the subcarrier spacing may be ordered to change (e.g. to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
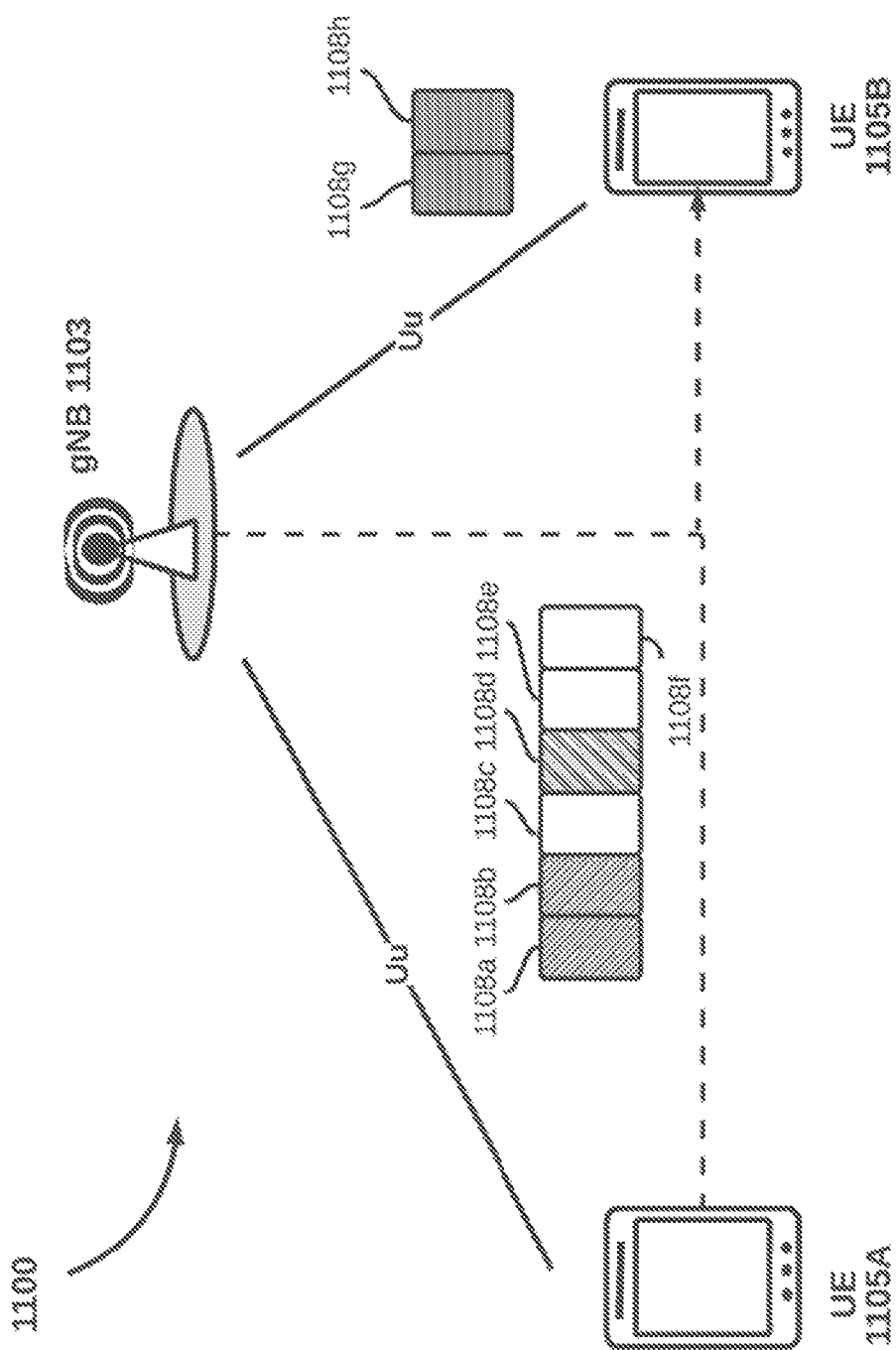
FIG. 11 shows example of a subband mobile communication system according to some aspects of some of various exemplary embodiments of the present disclosure.

FIG. 11 shows example of a mobile communication system 1100 according to some aspects of some of various exemplary embodiments of the present disclosure. The mobile communication 1100 may correspond to a portion of the network 100. The mobile communication system 1100 may operate over unlicensed band. The gNB 1103 and the UEs 1105A, 1105B may use listen before talk (LBT) schemes prior to transmitting over the shared communication channel. The LBT schemes may lower the interference and reduce the collision probability for the gNB 1103 and UEs 1105A-B, or any other devices contending the shared communication channel. In the mobile communication system 1100, the gNB 1103 and UEs 1105A-B may have different interference profile, and may need different LBT mechanisms. For instance, the gNB 1103 may use an LBT mechanism based on carrier sense, preamble detection, or correlation, while the UEs 1105 may use an LBT mechanism based on energy detection or vice versa. Moreover, the gNB 1103 and UEs 1105A-B may operate based on Frame Based Equipment (FBE) or Load Based Equipment (LBE) LBT schemes. In FBE scheme, channel sensing is performed at fixed time instants, while in LBE scheme, the channel sensing is performed at any time and duration.

As shown, the UEs 1105A-1105B communicate with the gNB 1103 in uplink via the subbands 1108, including 1108*a*-1108*h*. In some aspects, each of subbands 1108 may include several BWPs. In some aspects, each BWP may span across different subbands. The UEs 1105 may perform an LBT mechanism prior to accessing the shared channel to determine the free subbands. In some scenarios, the UEs 1105 may be in RRC idle state, and may perform an LBT to determine the available subbands for initial connection. In some other scenarios, the UEs 1105 may be in RRC connected state, and may perform an LBT to the determine the available subbands to switch to a new subbands. In some aspects, the subbands 1108 may belong to the same CC. In some other aspects the subbands 1108 may belong to different CCs.

One of the challenges of the multiband mobile communication system 1100 is that the UEs may need to try all the subbands or BPWs before determining a subband or BPW to switch. Since a UE (e.g., UE 1105A, 1105B) may have limited power, trying all the configured BWPs may not be efficient, it may increase power consumption, and also may increase the delay in switching between different subbands. In addition, in some cases there may be no point to try a different subbands. A trade off may exist in the number of UE LBT trials between the reliability and efficiency with power consideration and limited number of trails. For instance, the gNB 1103 may determine the available subbands, and may transmit the available subbands to the UEs 1105 via control signaling. In some aspects, the gNB 1103 may perform an LBT mechanism to determine the available subbands, and may transmit an identifier indicating the subbands to the UEs 1105. In some other aspects, the gNB may measure Key Performance Indicators (KPI) (e.g., throughput, latency, packet loss, etc) to determine the available subbands based on the KPIs and may transmit an identifier indicating the subbands to the UEs 1105. The KPIs may be used to measure properly of whether services (e.g., BWPs, subbands, etc) requested by the UEs 1105*s* can be accessed in given condition.

In some scenarios, the UE 1105A may be in RRC connected mode communicating to the gNB via subbands 1108*a*, 1108*b*, however it may want to switch to a new subbands (for example due to the sever interference in subbands 1108*a*, 1108*b*). In some other scenarios, the UE 1105A may be in RRC idle state trying to connect to the gNB 1103. The gNB 1105 may indicate the available subbands 1108*c*, 1108*e*, 1108*f* to the UE 1105A via a common or dedicated signaling. Once the UE 1105 A receives the available subbands from the gNB 1103, it may perform an LBT, and connect to the gNB 1103 via one or more of the available subbands 1108*c*, 1108*e*, 1108*f*.

Figure 12A:
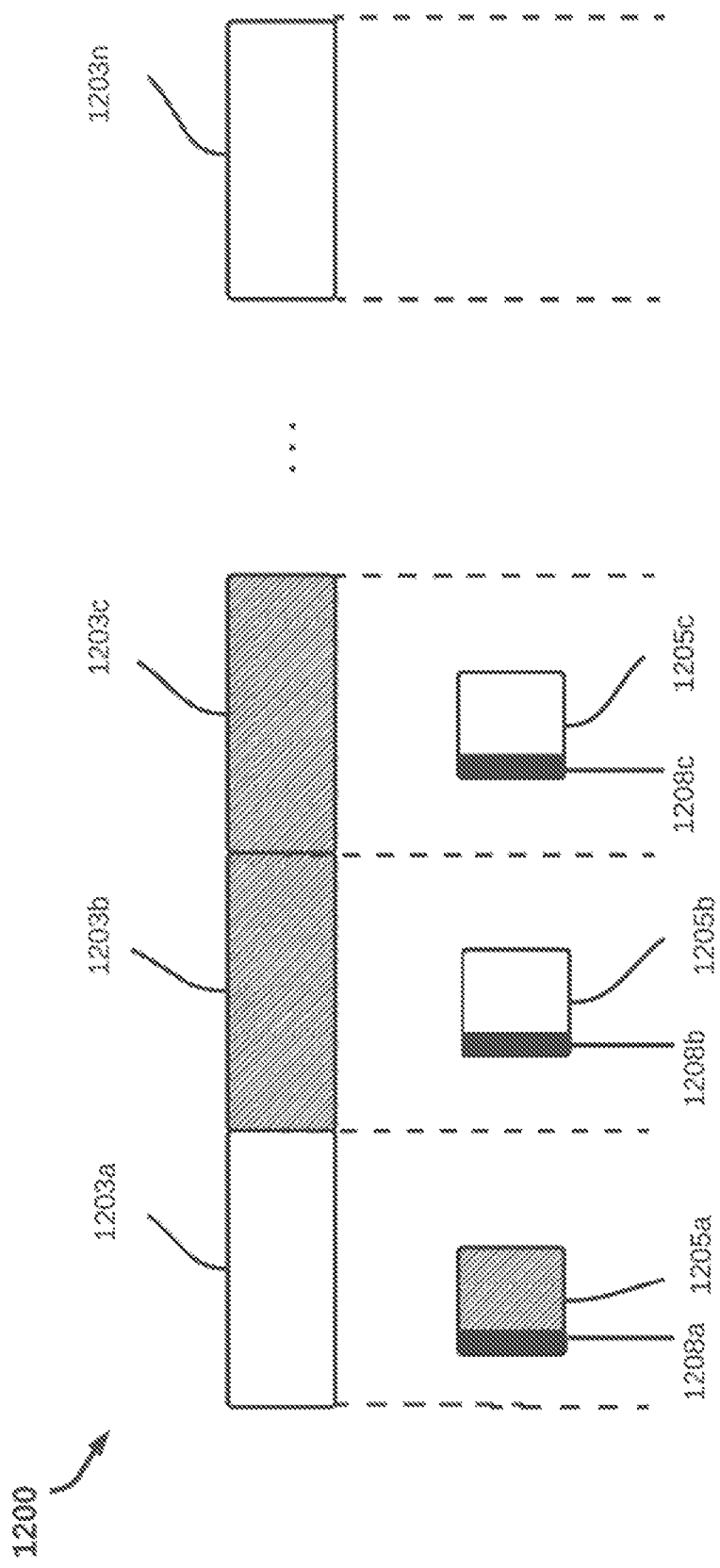
FIGS. 12A and 12B show example of bandwidth part switching process according to some aspects of some of various exemplary embodiments of the present disclosure.

FIG. 12A shows example of UL frequency band allocation scheme according to some aspects of some of various exemplary embodiments of the present disclosure. In this scheme, each of subbands 1203 may include several BWPs. The subband 1203 may include the BWP 1205*a* which is the current active BWP for a UE (e.g., UE 1105A). The BWP 1205*a* may include RACH resources 1208*a*. The RACH resources may include time (e.g., slots and symbols) and frequency resources that the UE may use to transmit PRACH. A gNB (e.g., gNB 1103) may transmit the RACH resource to the UE. The gNB may determine the available subbands 1203*b* and 1203*c*, and indicate to the UE these available subbands. The UE may perform an LBT on subbands 1203*b*-1203*c*, and switch to the BWP 1205*b* or 1205*c*. After the UE switched to the new BPW, it may perform a RACH process in the RACH resources 1208*b* or 1208*c* provided in the subbands 1203*b*, 1203*c* respectively.

Figure 12B:
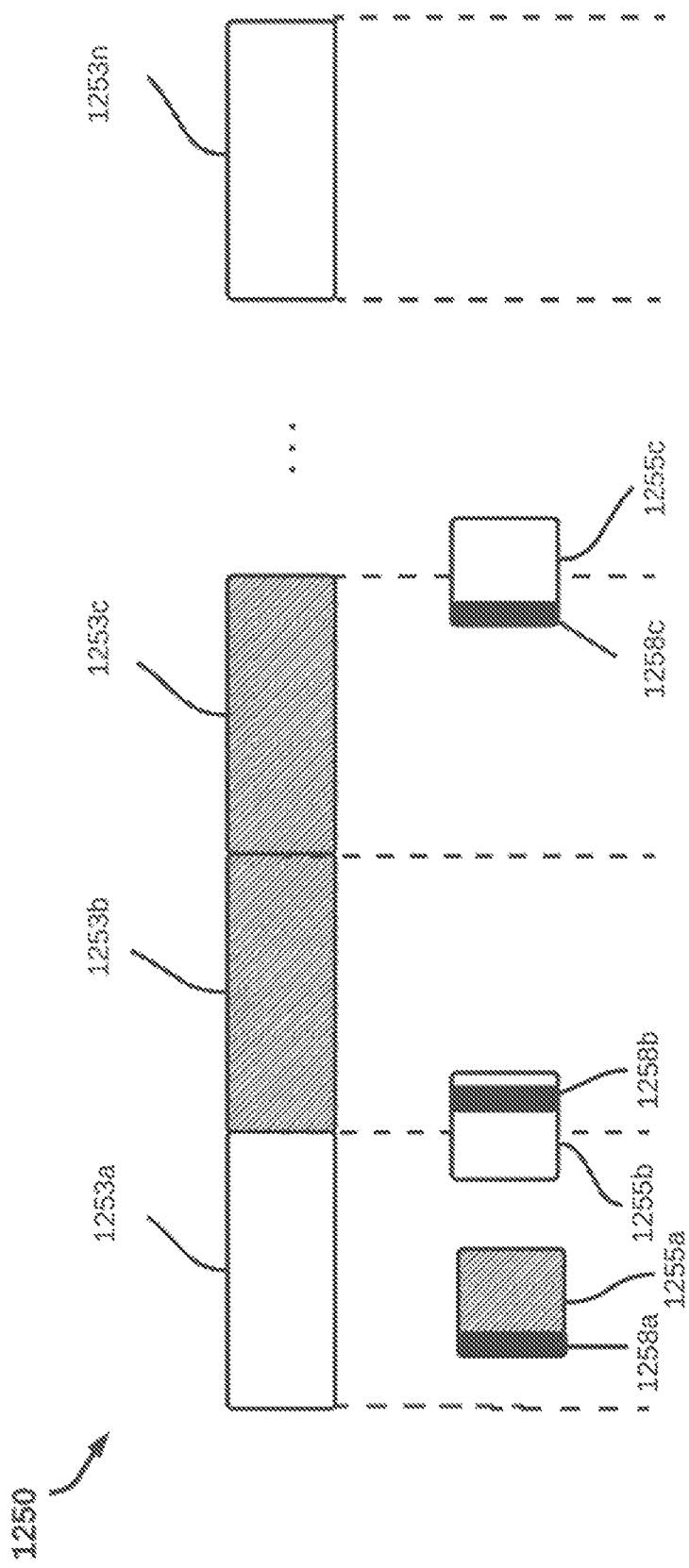

FIG. 12B shows example of UL frequency band allocation scheme according to some aspects of some of various exemplary embodiments of the present disclosure. In this scheme, each of subbands 1253 may include several BWPs. The subband 1253 may include the BWP 1255a which is the current active BWP for a UE (e.g., UE 1105A). The BWP 1255a may include RACH resources 1258a. The RACH resources may include time (e.g., slots and symbols) and frequency resources that the UE may use to transmit PRACH. A gNB (e.g., gNB 1103) may transmit the RACH resource to the UE. The gNB may determine the available subbands 1253b and 1253c, and indicate to the UE these available subbands. The UE may perform an LBT on subbands 1203b-1203c, and switch to the BWP 1255b or 1205c. As shown, in some scenario the new BWP 1255b, which the UE want to switch to, may span over frequency band 1253a, 1253b, but the RACH resource 1258b may be located in the frequency band 1253b. After the UE switched to the new BPW, it may perform a RACH process in the RACH resources 1258b provided in the subbands 1253b respectively.

Figure 13:
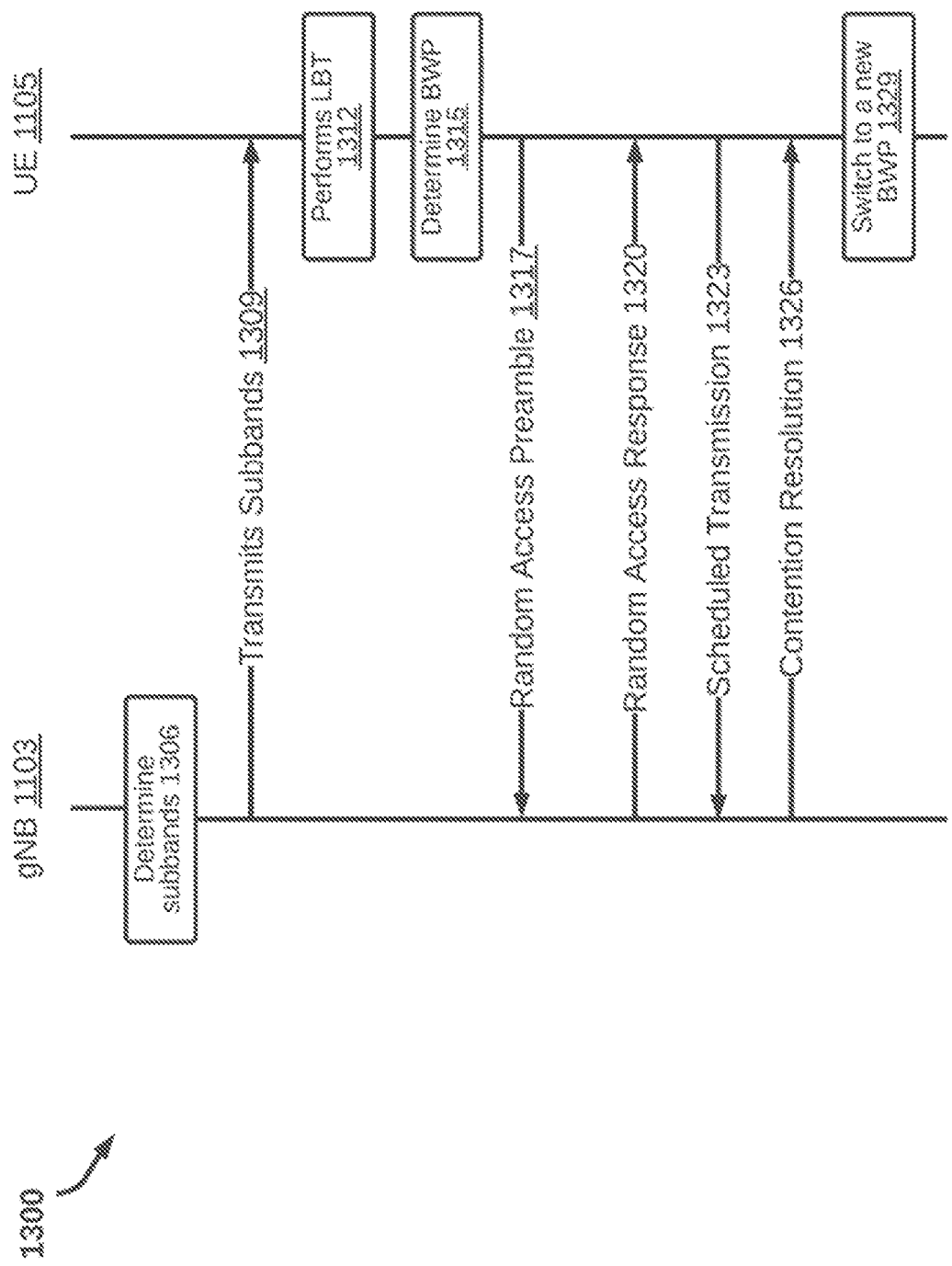
FIG. 13 is a signaling diagram of a four-step random access process according to some aspects of some of various exemplary embodiments of the present disclosure.

FIG. 13 is a signaling diagram of an exemplary method 1300 for a four-step contention-based random access processes according to some aspects of some of various exemplary embodiments of the present disclosure. The method 1300 is implemented between a gNB 1103 and UE 1105 (e.g., 1105A,1105B). It will be appreciated that while described in the exemplary context of a 5G NR based network, as previously described, the method 1300 is in no way limited. As illustrated, the method 1300 may include a number of enumerated steps, but embodiment of method 1300 may include additional steps before, after or/and between the steps. In some embodiments one or more of the enumerates steps may be omitted.

At step 1206, the gNB 1103 determines the available subbands for the transmission of information in UL from the UE. In some aspects, the gNB may perform an LBT on each of the subbands and may determine the subbands that LBT pass. For example, the gNB may listen to UL channel, and measure the interference level in each of the UL subbands. In some other aspects, the gNB may measure the KPIs to determine the available subbands. For example, the gNB may measure throughput, latency, and/or packet loss in each of the UL subbands to determine the available UL subbands.

At the step 1309, the gNB transmits the determined subbands from step 1306 to the UE. The gNB may indicate each subband by an Identification (ID), and transmit the IDs to the UE. The gNB may transmit the subbands IDs via a control signaling. In some aspects, the gNB may transmit the subbands IDs via Master Information Block (MIB) or System Information Block (SIB1). In some aspect, the gNB may transmit the subbands IDs via common RRC signaling to a group of UEs. In some aspects, the gNB may transmit the subbands IDs to a specific UEs via dedicated RRC signaling. In some other aspects, the gNB may transmit the IDs via Downlink Control Information (DCI) to the group of UEs or specific UE.

At step 1312, the UE performs an LBT on the indicated subbands by the gNB, and determines the subbands that LBT pass. For example, the UE may listen to the each of indicated subbands, and measure the interference level in each of the subbands.

At step 1315, the UE determines a BWP based on the result of LBT from the step 1312. The determined BWP may have RACH resources in one of the subbands that UE LBT pass. In some aspects, the determined BWP may span in only one subband. In some aspects, the determined BWP may span across two or more subbands.

At step 1317, the UE transmits a random access preamble to the gNB in the determined BWP. The random access preamble may be generated based according to the determined BWP.

At step 1320, upon detection of random access preamble, the gNB transmits a random access response. The random access response may include information such as timing advance, UL grant, and RACH power control.

At step, 1323, the UE transmits a scheduled transmission request based on the received random access response.

Finally, at step 1326 the gNB transmits a contention resolution request to the UE. The contention resolution request may include information to establish a communication between the gNB and UE.

At step 1329, the UE switch to a new BWP, and starts transmitting data in the new BWP to the gNB.

Figure 14:
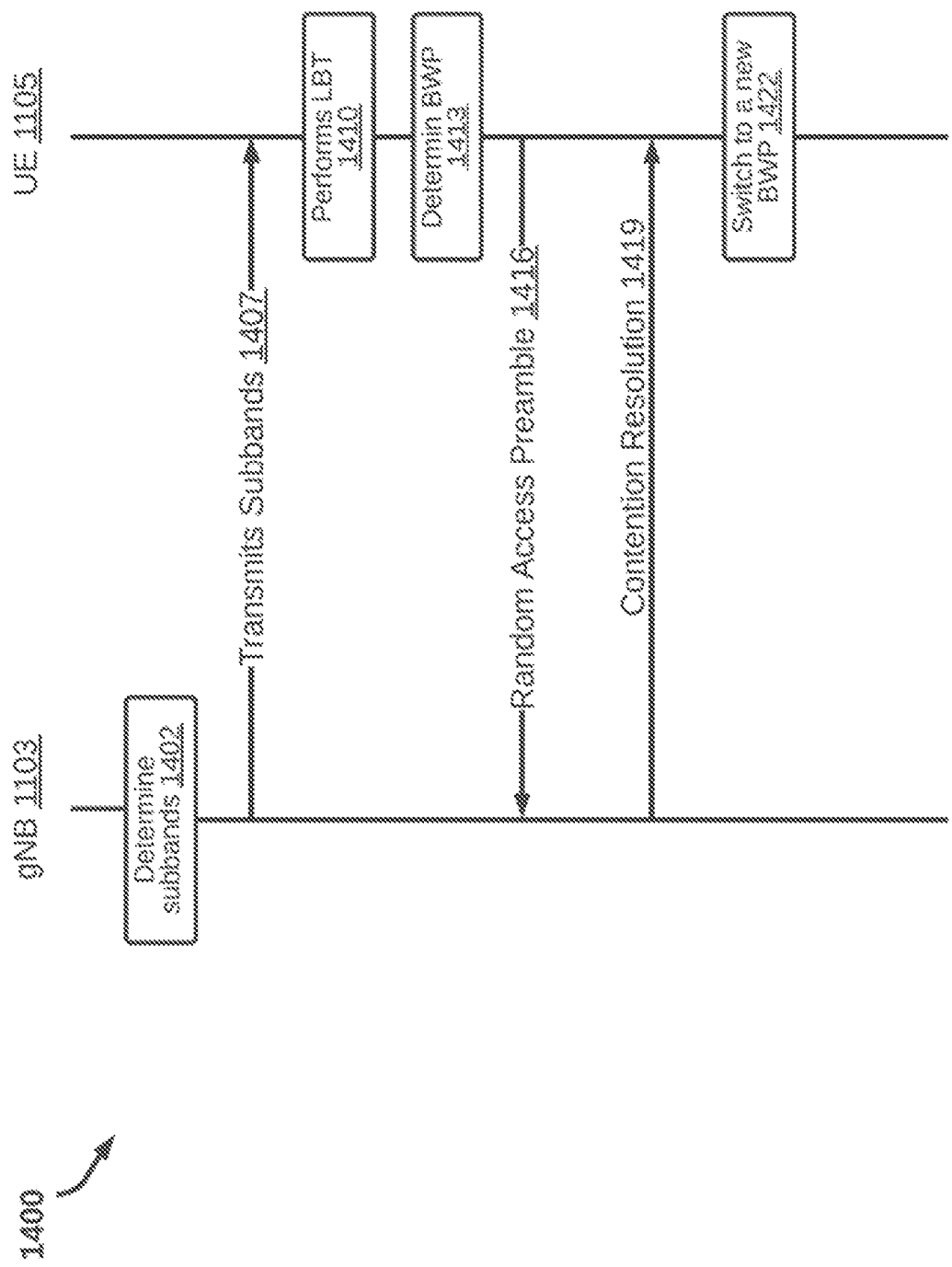
FIG. 14 is a signaling diagram of a two-step random access process according to some aspects of some of various exemplary embodiments of the present disclosure.

FIG. 14 is a signaling diagram of an exemplary method 1400 for a two-step contention-based random access processes according to some aspects of some of various exemplary embodiments of the present disclosure. The method 1400 is implemented between a gNB 1103 and UE 1105 (e.g., 1105A,1105B). It will be appreciated that while described in the exemplary context of a 5G NR based network, as previously described, the method 1400 is in no way limited. As illustrated, the method 1400 may include a number of enumerated steps, but embodiment of method 1400 may include additional steps before, after or/and between the steps. In some embodiments one or more of the enumerates steps may be omitted.

At step 1402, the gNB 1103 determines the available subbands for the transmission of information in UL from the UE. In some aspects, the gNB may perform an LBT on each of the subbands and may determine the subbands that LBT pass. For example, the gNB may listen to UL channel, and measure the interference level in each of the UL subbands. In some other aspects, the gNB may measure the KPIs to determine the available subbands. For example, the gNB may measure throughput, latency, and/or packet loss, etc., in each of the UL subbands to determine the available UL subbands.

At the step 1407, the gNB transmits the determined subbands from step 1402 to the UE. The gNB may indicate each subband by an Identification (ID), and transmit the IDs to the UE. The gNB may transmit the subbands IDs via a control signaling. In some aspects, the gNB may transmit the subbands IDs via Master Information Block (MIB) or System Information Block (SIB1). In some aspect, the gNB may transmit the subbands IDs via common RRC signaling to a group of UEs. In some aspects, the gNB may transmit the subbands IDs to a specific UEs via dedicated RRC signaling. In some other aspects, the gNB may transmits the IDs via Downlink Control Information (DCI) to the group of UEs or specific UE.

At step 1410, the UE performs an LBT on the indicated subbands by the gNB, and determines the subbands that LBT pass. For example, the UE may listen to the each of indicated subbands, and measure the interference level in each of the subbands.

At step 1413, the UE determines a BWP based on the result of LBT from the step 1412. The determined BWP may have RACH resources in one of the subbands that UE LBT pass. In some aspects, the determined BWP may span in only one subband. In some aspects, the determined BWP may span across two or more subbands.

At step 1416, the UE transmits a random access preamble to the gNB in the determined BWP. The random access preamble may be generated according to the determined BWP. In addition, the step 1416 includes transmission of a connection request by the UE.

At step 1419, upon detection of random access preamble, the gNB transmits a random access response and a contention resolution request. The random access response may include information such as timing advance, UL grant, and RACH power control. The contention resolution request may include information to establish a communication between the gNB and UE.

At step 1422, the UE switch to a new BWP, and starts transmitting data in the new BWP to the gNB.

The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA).

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure. For CBRA, if contention resolution is successful upon receiving the network response, the UE may end the random access procedure while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

FIG. 15 shows one exemplary embodiment of a MIB message according to some aspects of some of various exemplary embodiments of the present disclosure. In this embodiment, a MIB message is generated and broadcasted to a group of UEs. MIB message may be transmitted over BCH transport and PBCH physical channel, and may include necessary information required to decode System Information Block Type 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI); SIB1 may be referred to as remaining minimum system information (RMSI). In some aspects, the MIB message may be repeated periodically. In one example implementation, the MIB periodicity may be 80 ms, and may be transmitted on symbol 1, 2, 3 in a time frame similar to a time frame of FIG. 8. As shown, the relevant Information Element (IE) 1500 includes a "bwp_list" 1505, configured as a enumerated list of integers {ID1, ID2, . . . , IDN}, where IDi, i=1, . . . . N, is an integer indicating subband i. Also, note that in the illustrated embodiment, the "bwp_list" may indicate the available subbands for UL (e.g., gNB 1103), as described previously in FIGS. 11,12A-B. In some aspects, the "bwp_list" may indicate the list of UL subbands the UEs may avoid to use. For instance, the gNB may send the subbands list that may have high interference power to the UEs to avoid.

FIG. 16 shows one exemplary embodiment of a ServingCellConfigCommon message according to some aspects of some of various exemplary embodiments of the present disclosure. In this embodiment, a ServingCellConfigCommon message is generated and broadcasted to a group of UEs. ServingCellConfigCommon message may be transmitted over BCH transport and PBCH physical channel, and may be used to configure cell specific parameters of a UE's serving cell. The ServingCellConfigCommon may include parameters which a UE would typically acquire from SSB, MIB or SIBs when UE is in RRC idle state. In some aspects, the network may provide the relevant IE ServingCellConfigCommon in dedicated signaling with a SCell or with an additional cell group (SGC). In some aspects, the network may provide relevant IE for Spcell (MCG and SGC) upon configuration with sync. As shown, the relevant IE 1600 include a "bwp_list" 1609, configured as a enumerated list of integers {ID1, ID2, . . . , ID3}, where IDi, i=1, . . . . N, is an integer indicating subband i. Also, note that in the illustrated embodiment, the "bwp_list" may indicate the available subbands for UL (e.g., gNB 1103), as described previously in FIGS. 11,12A-B. In some aspects, the "bwp_list" may indicate the list of UL subbands the UEs may avoid to use. For instance, the gNB may send the subbands list that may have high interference power to the UEs to avoid.

Figure 17:
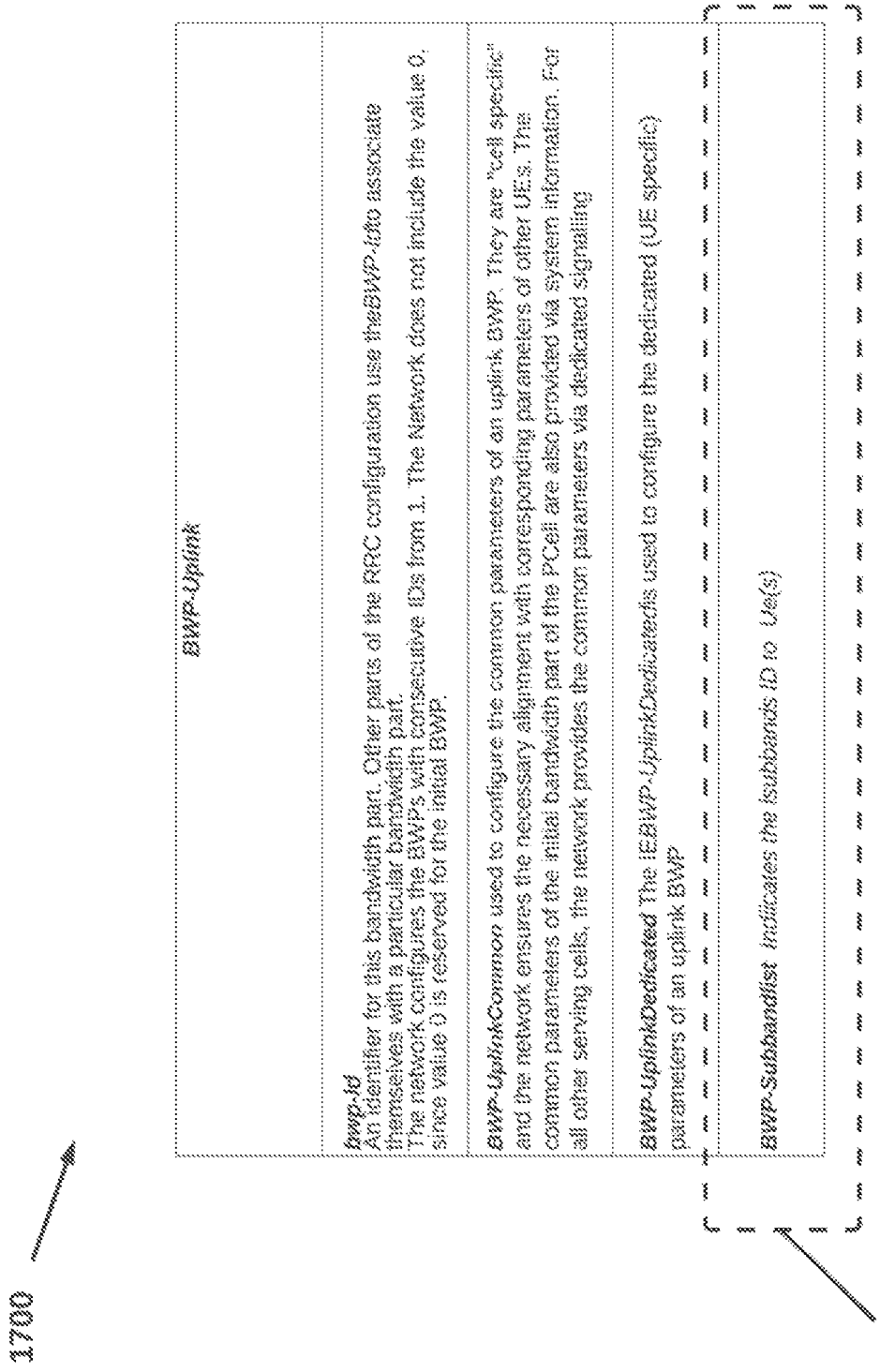
FIG. 17 is a tabular representation of an exemplary uplink Information Element (IE) BWP-uplink similar to IE BWP-Uplink specified in 3GPP resources.

FIG. 17 shows one exemplary embodiment of a BWP-Uplink message according to some aspects of some of various exemplary embodiments of the present disclosure. In this embodiment, a BWP-Uplink message includes a BWP-UplinkCommon part and a BWP-UplinkDedicated part. BWP-UplinkCommon is generated and broadcasted to a group of UEs; BWP-UplinkDedicated is generated and broadcasted to a specific UE. The BWP-UplinkCommon may include common parameters required for configuring a cell bandwidth, and may be transmitted via system information. The BWP-UplinkDedicated may include parameters required for configuring a specific UE bandwidth, and may be transmitted via dedicated RRC signaling.

As shown, the relevant IE 1700 include a "BWP_Subbandlist" 1709, configured as a enumerated list of integers {ID1, ID2, . . . , ID3}, where IDi, i=1, . . . . N, is an integer indicating subband i. Also, note that in the illustrated embodiment, the "BWP_Subbandlist" may indicate the available subbands for UL (e.g., gNB 1103), as described previously in FIGS. 11,12A-B. In some aspects, the "BWP-Subbandlist" may indicate the list of available subbands to a group of UEs and may be assigned to BWP_UplinkCommon. In some aspects, the "BWP-Subbandlist" may indicate the list of available subbands to a specific UE and may be assigned to BWP_UplinkDedicated. In some aspects, the "BWP_Subbandlist" may indicate the list of UL subbands the UEs may avoid to use. For instance, the gNB may send the subbands list that may have high interference power to the UEs to avoid.

Figure 18:
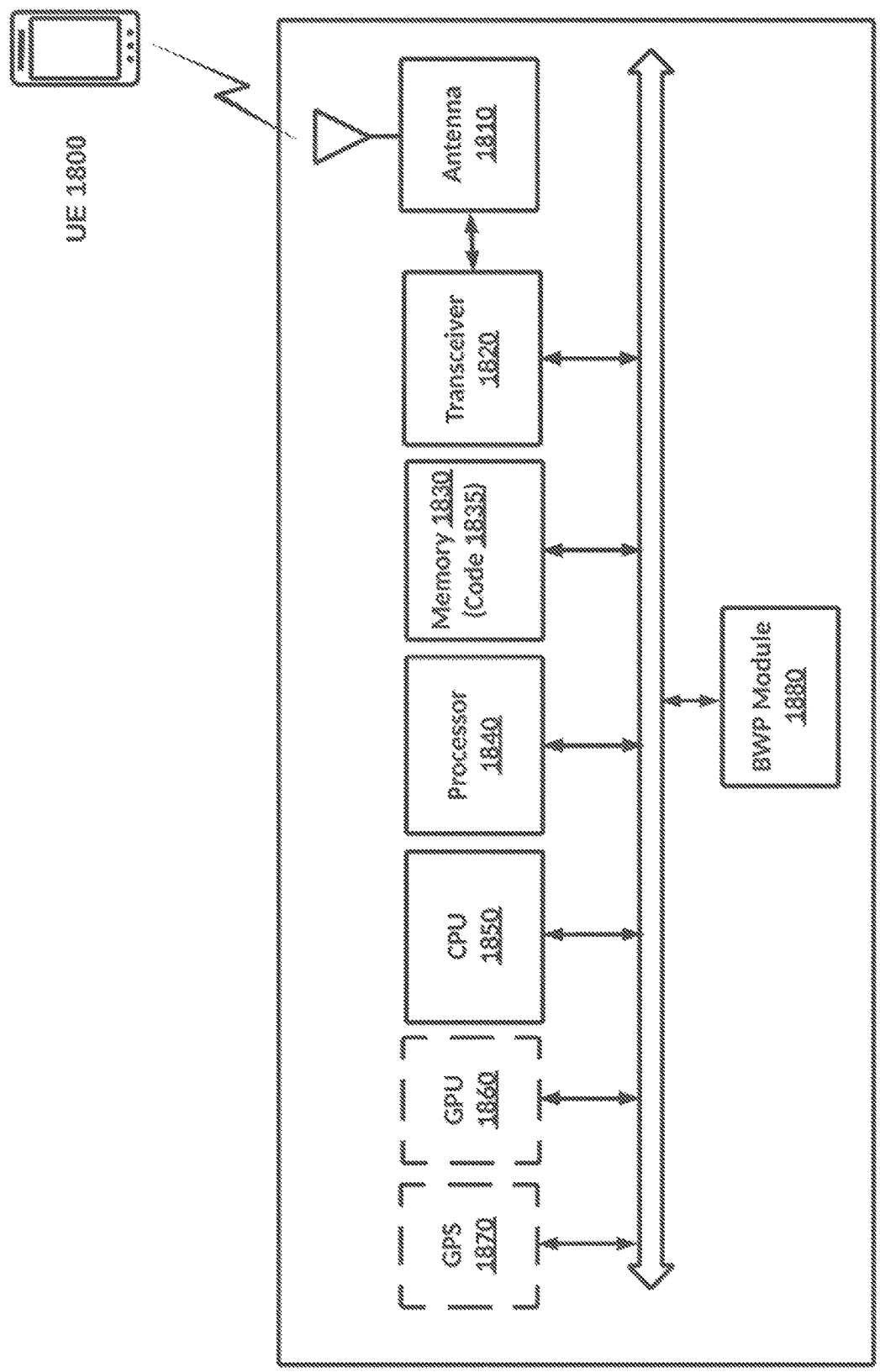
FIG. 18 shows example of a User End (UE) device according to some aspects of some of various exemplary embodiments of the present disclosure.

FIG. 18 shows a block diagram of an exemplary UE 1800 according to some aspects of some of various exemplary embodiments of the present disclosure. All or a subset of blocks and functions in FIG. 18 may be in the UE 1800 and may be performed by the user equipment 1800. The Antenna 1810 may be used for transmission or reception of electromagnetic signals. The Antenna 1810 may comprise one or more antenna elements and may enable different input-output antenna configurations including Multiple-Input Multiple-Output (MIMO) configuration, Multiple-Input Single-Output (MISO) configuration and Single-Input Multiple-Output (SIMO) configuration. In some embodiments, the Antenna 18100 may enable a massive MIMO configuration with tens or hundreds of antenna elements. The Antenna 1810 may enable other multi-antenna techniques such as beamforming. In some examples and depending on the UE 1800 capabilities or the type of UE 1800 (e.g., a low-complexity UE), the UE 1800 may support a single antenna only.

The transceiver 1820 may communicate bi-directionally, via the Antenna 1810, wireless links as described herein. For example, the transceiver 1820 may represent a wireless transceiver at the UE and may communicate bi-directionally with the wireless transceiver at the base station or vice versa. The transceiver 1820 may include a modem to modulate the packets and provide the modulated packets to the Antennas 1810 for transmission, and to demodulate packets received from the Antennas 1810.

The memory 1830 may include RAM and ROM. The memory 1830 may store computer-readable, computer-executable code 1835 including instructions that, when executed, cause the processor to perform various functions described herein. In some examples, the memory 1830 may contain, among other things, a Basic Input/Output System (BIOS) which may control basic hardware or software operation such as the interaction with peripheral components or devices.

The processor 1840 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1840 may be configured to operate a memory using a memory controller. In other examples, a memory controller may be integrated into the processor 1840. The processor 1840 may be configured to execute computer-readable instructions stored in a memory (e.g., the memory 1830) to cause the UE 1800 to perform various functions.

The Central Processing Unit (CPU) 1850 may perform basic arithmetic, logic, controlling, and Input/output (I/O) operations specified by the computer instructions in the Memory 1830. The UE 1800 may include additional peripheral components such as a graphics processing unit (GPU) 1860 and a Global Positioning System (GPS) 1870. The GPU 1860 is a specialized circuitry for rapid manipulation and altering of the Memory 1830 for accelerating the processing performance of the user equipment 1800. The GPS 1870 may be used for enabling location-based services or other services for example based on geographical position of the user equipment 1800.

The BWP module 1880 may be implemented via hardware, software, or combination thereof. For instance, the BWP module 1880 may be implemented as instructions codes, stored in the memory 1830 and executed by the processor 1840, or as a circuit. The BWP module 1880 may be used to perform various aspects and functionality related to present disclosure. For instance, the BWP module 1880 is configured to receive subbands IDs form a base station (e.g., gNB 1103), perform an LBT on each of the received subbands from the base station, determine the subband that pass LBT, perform a RACH process (e.g., four-step RACH 1400, two-step RACH 1500), switch to a new BWP, and transmit data and control signaling to the base station as described in greater detail previously.

Figure 19:
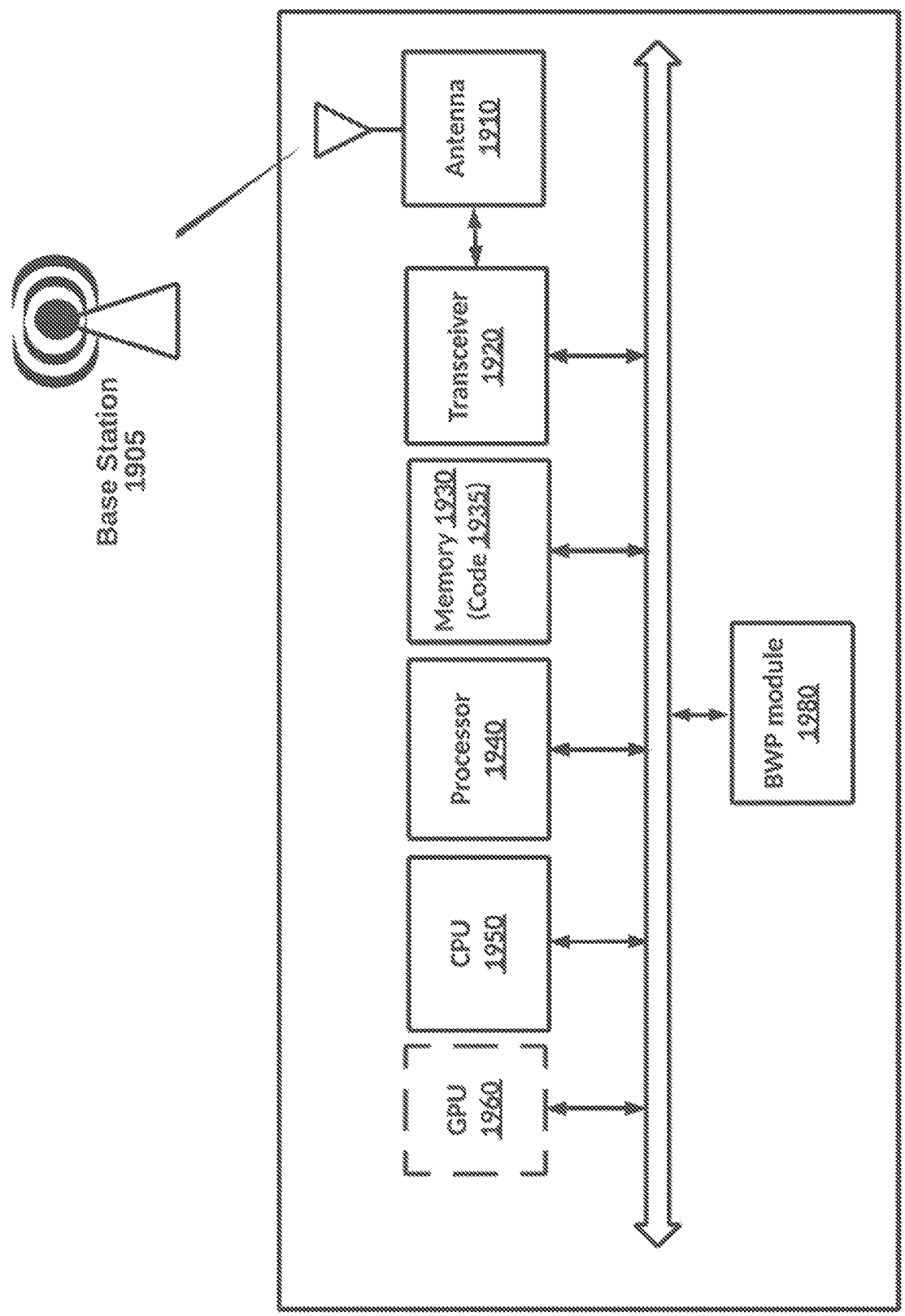
FIG. 19 shows example of a base station device according to some aspects of some of various exemplary embodiments of the present disclosure.

FIG. 19 shows a block diagram of an exemplary base station 1900 according to some aspects of some of various exemplary embodiments of the present disclosure. All or a subset of blocks and functions in FIG. 19 may be in the UE 1800 and may be performed by the base station 1900. The Antenna 1910 may be used for transmission or reception of electromagnetic signals.

The Antenna 1910 may comprise one or more antenna elements and may enable different input-output antenna configurations including Multiple-Input Multiple-Output (MIMO) configuration, Multiple-Input Single-Output (MISO) configuration and Single-Input Multiple-Output (SIMO) configuration. In some embodiments, the Antenna 1910 may enable a massive MIMO configuration with tens or hundreds of antenna elements. The Antenna 1910 may enable other multi-antenna techniques such as beamforming. In some examples and depending on the UE 1900 capabilities or the type of UE 1900 (e.g., a low-complexity UE), the UE 1900 may support a single antenna only.

The transceiver 1920 may communicate bi-directionally, via the Antenna 1810, wireless links as described herein. For example, the transceiver 1820 may represent a wireless transceiver at the UE and may communicate bi-directionally with the wireless transceiver at the base station or vice versa. The transceiver 1920 may include a modem to modulate the packets and provide the modulated packets to the Antennas 1910 for transmission, and to demodulate packets received from the Antennas 1910.

The memory 1930 may include RAM and ROM. The memory 1930 may store computer-readable, computer-executable code 1935 including instructions that, when executed, cause the processor to perform various functions described herein. In some examples, the memory 1930 may contain, among other things, a Basic Input/Output System (BIOS) which may control basic hardware or software operation such as the interaction with peripheral components or devices.

The processor 1940 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1940 may be configured to operate a memory using a memory controller. In other examples, a memory controller may be integrated into the processor 1940. The processor 1940 may be configured to execute computer-readable instructions stored in a memory (e.g., the memory 1830) to cause the base station 1900 to perform various functions.

The Central Processing Unit (CPU) 1950 may perform basic arithmetic, logic, controlling, and Input/output (I/O) operations specified by the computer instructions in the Memory 1830. The base station 1900 may include additional peripheral components such as a graphics processing unit (GPU) 1960 and a Global Positioning System (GPS) 1970. The GPU 1960 is a specialized circuitry for rapid manipulation and altering of the Memory 1930 for accelerating the processing performance of the base station 1900.

The BWP module 1980 may be implemented via hardware, software, or combination thereof. For instance, the BWP module 1980 may be implemented as instructions codes, stored in the memory 1930 and executed by the processor 1940, or as a circuit. The BWP module 1980 may be used to perform various aspects and functionality related to present disclosure. For instance, the BWP module 1980 is configured to determine the available subbands (e.g., based on KPI or LBT), transmits the list of subbands IDs to a specific UEs or a group of UEs (e.g., UE 1105), transmit RACH response (e.g., four-step RACH 1400, two-step RACH 1500), receive BWP information form the UEs as described in greater detail previously.

Figure 20:
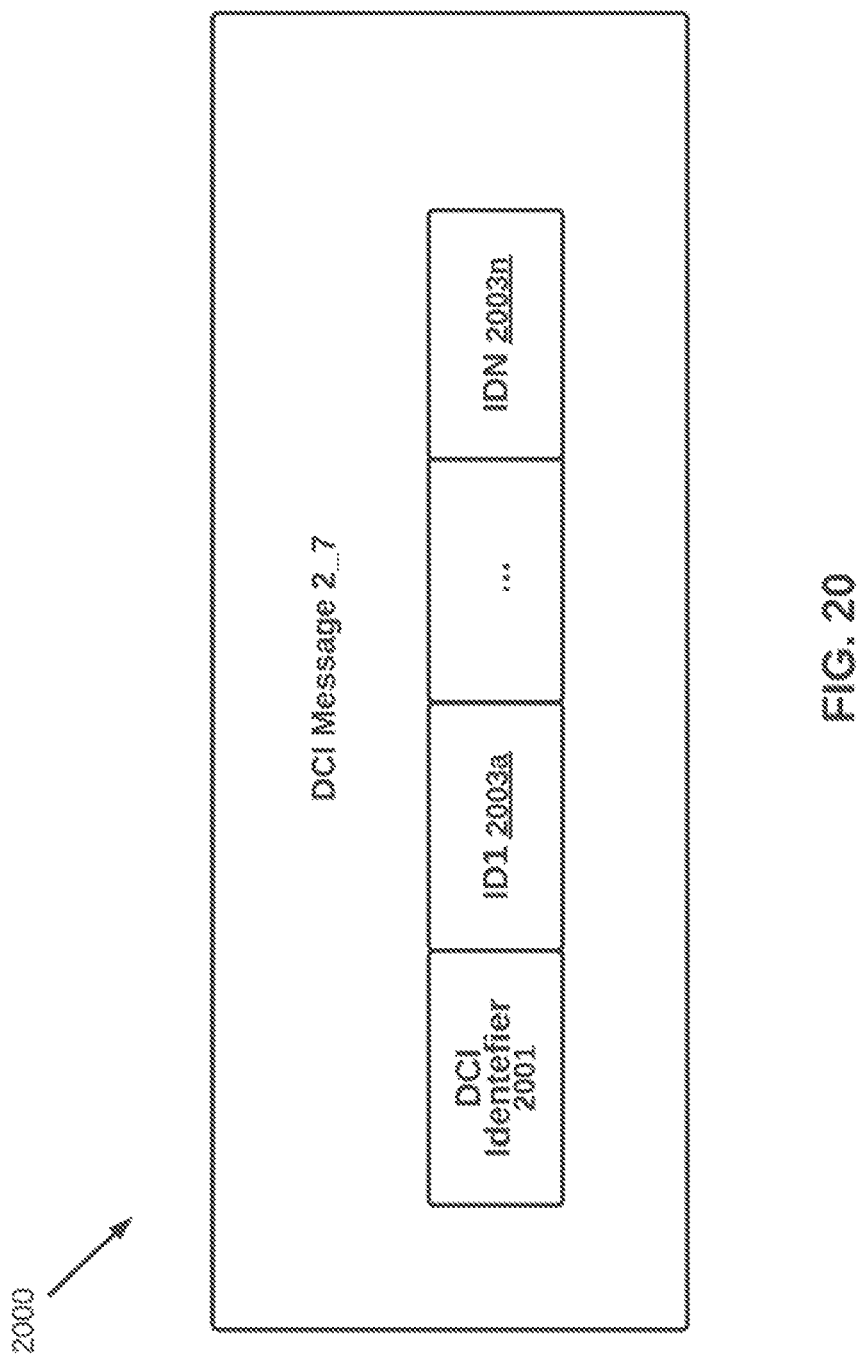
FIG. 20 shows example of a downlink control information message structure according to some aspects of some of various exemplary embodiments of the present disclosure.

FIG. 20 shows an exemplary downlink control information (DCI) message structure 2000 according to according to some aspects of some of various exemplary embodiments of the present disclosure. The DCI message 2000 may be used by the gNB to transmit the list of subbands IDs to a UE or group. As shown, the DCI message 2000 may include:
 (i) a DCI identifier 2001 which indicate the DCI format 2-7
 (ii) Subbands IDs list {ID1, . . . , IDN} 2003a-2003n

The DCI format 2_7 may be configured for group-common PDCCH or UE specific PDCCH. In some examples, if the UE does not receive DCI format 2_7 via the group-common PDCCH, the UE may receive the DCI format 2_7 via a UE-specific PDCCH in a slot. The gNB may inform the UE through RRC signaling whether to decode group-common PDCCH or UE-specific PDCCH. In some instances that group-common PDCCH is transmitted, the UE may decide to decode common-group PDCCH or not. Moreover, when the UE is monitoring for common-group PDCCH, it may process a detected UE-specific PDCCH irrespective of whether the group-common PDCCH is received or not.

Figure 21:
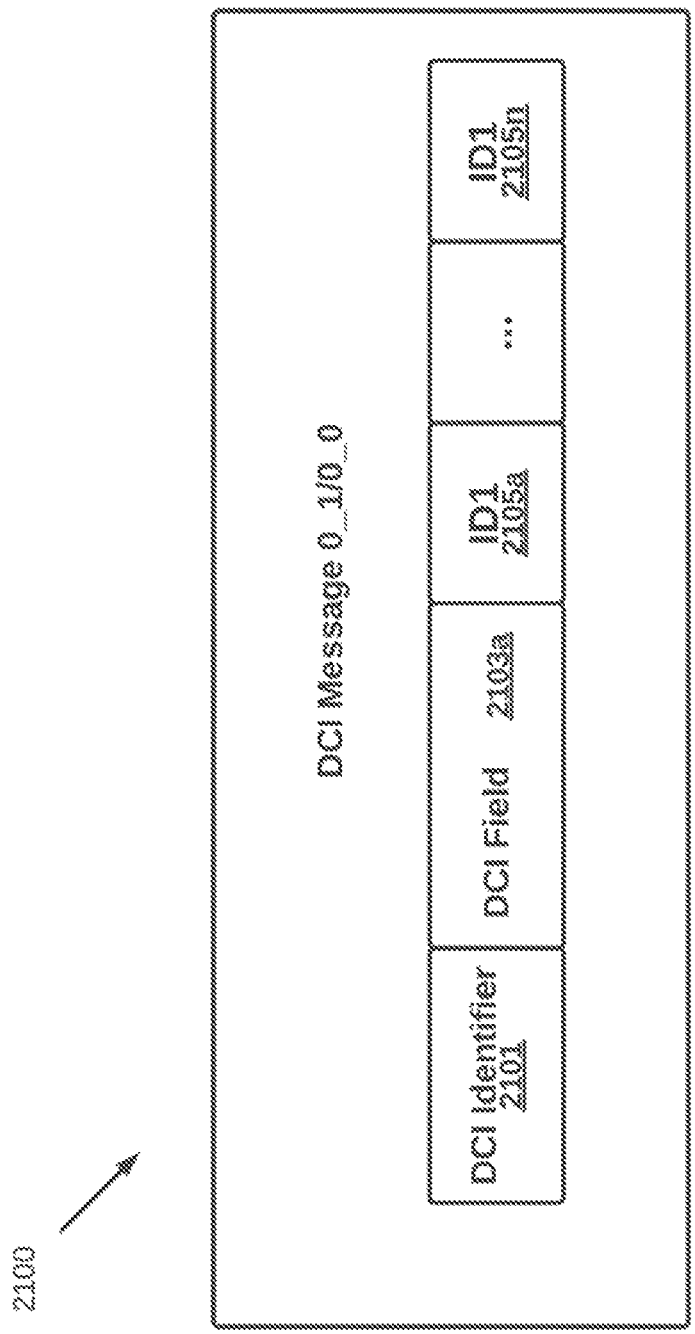
FIG. 21 shows example of a downlink control information message structure according to some aspects of some of various exemplary embodiments of the present disclosure.

The UE receives the information about common and UE-specific search space for the group-common PDCCH or UE-specific PDCCH via IE SearchSpace. The SearchSpace configured from the network defined how/where to search for PDCCH candidates. In some embodiment, of the UE is configured to receive DCI format 2_7, the IE SearchSpace may include a "dci-format 2-7" indicator to indicate to the UE to monitor PDCCH candidates format 2_7 as follows:

FIG. 21 shows an exemplary downlink control information (DCI) message structure 2100 according to according to some aspects of some of various exemplary embodiments of the present disclosure. The DCI message 2100 may be used by the gNB to transmit the list of subbands IDs to a UE or group of the UEs. In some examples, the DCI format 0_0/0_1, scrambled by an RNTT. As shown, the DCI message 2100 may include:

---

IE SearchSpace {

...

dci-Format 2-7

...

}

---

(i) a DCI identifier which indicate the DCI format 0_0/0_0
 (ii) DCI field 2103 includes information for scheduling PUSCH in one cell
 (ii) Subbands IDs list {ID1, . . . , IDN} 2105a-2105n.

The DCI format 0_0/0_1 may be configured for group-common PDCCH or UE specific PDCCH. In some examples, if the UE does not receive DCI format 0_0/0_1 via the group-common PDCCH, the UE may receive the DCI format 0_0/0_1 via a UE-specific PDCCH in a slot. The gNB may inform the UE through RRC signaling whether to decode group-common PDCCH or UE-specific PDCCH. In some instances that group-common PDCCH is transmitted, the UE may decide to decode common-group PDCCH or not. Moreover, when the UE is monitoring for common-group PDCCH, it may process a detected UE-specific PDCCH irrespective of whether the group-common PDCCH is received or not.

Figure 22:
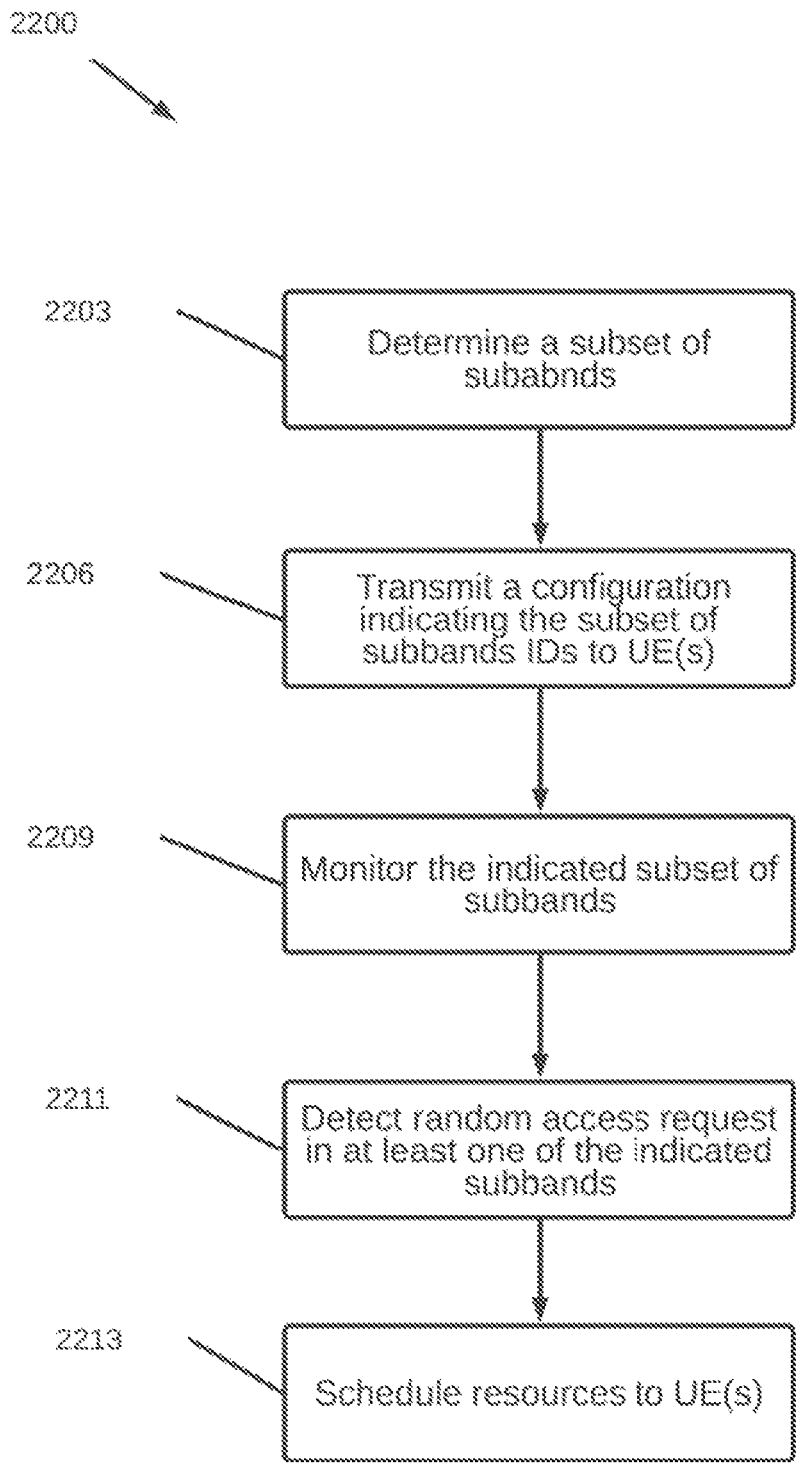
FIG. 22 is a flow diagram of bandwidth part switching method according to some aspects of some of various exemplary embodiments of the present disclosure.

FIG. 22 is a flow diagram of BWP switching mechanism according to some aspects of some of various exemplary embodiments of the present disclosure. The method 2200 is described with reference to one of the gNBs 1103, 1900 described in FIG. 11, 18 respectively.

At step 2203, the gNB determines a subset of subbands, which are available for the UL communication. In some aspects gNB may measure the KPI (e.g., throughput, packet loss, latency, etc) to determine the available subbands. In some other aspects the gNB may perform an LBT mechanism to determine the available subbands.

At step 2206, the gNB transmit a configuration indicating the list of available subbands to a group of UEs and/or a specific UE. In a first embodiment, the gNB may transmit the configuration via broadcast signaling (e.g., MIB, SIB1). In a second embodiment, the gNB may transmit the configuration via common or dedicated RRC signaling. In a third embodiment, the gNB may transmit the configuration via a DCI message.

At step 2209, the gNB monitors the subbands indicated to the UE(s). At step 2211, if gNB receives a random access request in at least one of the indicated subbands, it detects it.

At step 2213, the gNB schedules UE(s) time and frequency resources for reception of UL information in at least one of the indicated subbands.

Figure 23:
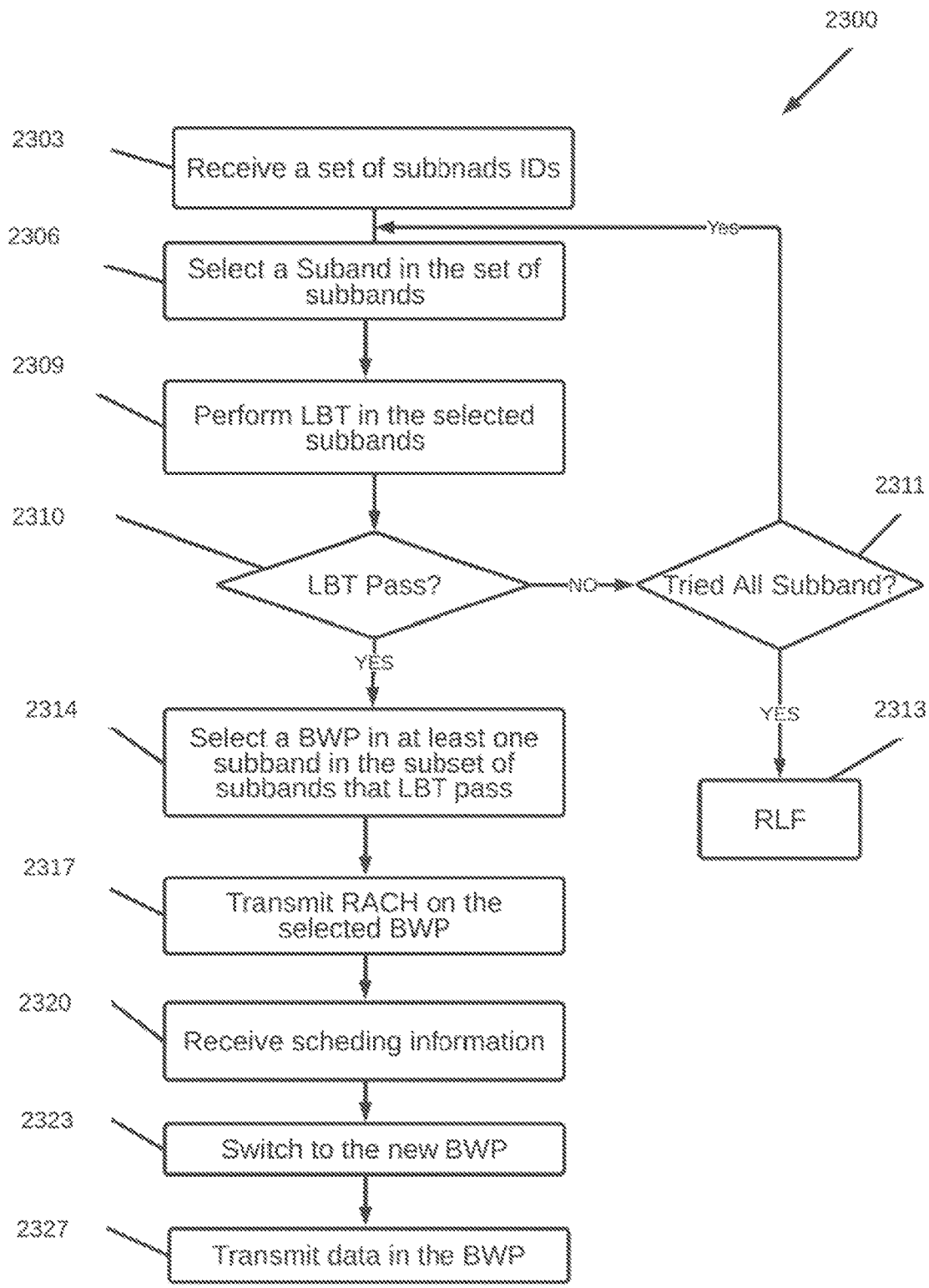
FIG. 23 is a flow diagram of bandwidth part switching method according to some aspects of some of various exemplary embodiments of the present disclosure.

FIG. 23 is a flow diagram of BWP switching mechanism according to some aspects of some of various exemplary embodiments of the present disclosure. The method 2300 is described with reference to one of the UEs 1105, 1800 described in FIG. 11, 19 respectively.

At step 2303, the UE receives a configuration from a gNB indicating a list of available subbands IDs.

At step 2306, the UE selects a subband in the set of indicated subbands for UL transmission of data to the gNB. In an embodiment the UE may select a subset of subbands in the set of subbands, and perform LBT for all the subbands in the subset simultaneously to determine the available subbands for UL transmission of information.

At step 2309, the UE perform an LBT mechanism to determine if the selected subband pass LBT.

At step 2310 if the LBT passes for the selected subband, the UE proceed to step 2310. If the LBT fails for the elected subband, the UE proceeds to step 2311 and check if it has performed LBT for all the subband in the set indicated by gNB.

At step 2313, if all the LBT failed for all the subbands in the set of subbands indicated by the gNB, the UE informs Radio Link Failure (RLF) to the gNB.

At step 2314, the UE selects a BWP in at least on the subband that pass LBT test.

At step 2320, the UE transmits a random access request to the gNB on the selected BWP.

At step 2323, if random access request was successful, the switch to the new BWP.

At step 2327, the UE start transmitting information data to gNB on the new BPW.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

Clause 1. A method of data transmission, comprising the steps of: receiving, by a user
equipment (UE), a configuration message indicating one or more frequency bands for transmitting a radio signal; and determining, by the UE, a
subset of the one or more frequency bands; and
performing by the UE, a listen before talk (LBT) operation on each frequency band of the subset of the one or more frequency bands; and transmitting, by the UE, a radio signal in at least one of the frequency bands of the subset.

Clause 2. The method of clause 1, wherein the transmitting includes transmitting at least one of a random access request, an information data signal or a control signal.

Clause 3. The method of clause 1, wherein the determining includes determining a bandwidth part (BWP) in the at least one of the frequency bands of the subset, wherein the BWP spans across the at least one of the frequency bands of the subset; and selecting the BWP for the transmission of the radio signal.

Clause 4. The method of clause 3, wherein the bandwidth part (BWP) includes:
    a first part for transmitting the random access request; and
    a second part for transmitting the information data and/or the control signal.

Clause 5. The method of clause 4, wherein the transmitting includes transmitting the random access request in the first part of the bandwidth part (BWP) and
    transmitting the information data signal and/or control signal in the second part of the BWP.

Clause 6. The method of clause 1 wherein:
    the configuration message includes an identification that specifies bandwidth and location of each of the one or more frequency bands of the subset.

Clause 7. The method of clause 1, wherein the configuration message is received via a Radio Resource Layer (RRC) protocol.

Clause 8. The method of clause 1, wherein the configuration message is received via a dedicated user equipment (UE) specific signaling.

Clause 9. The method of clause 1, wherein the user equipment (UE) is positioned in a cell of a wireless network and the configuration message is received via a common signaling shared by the UE and other UEs in the cell of the wireless network.

Clause 10. The method of clause 1, wherein the configuration message is received via a downlink control information (DCI) message that includes an identification that specifies bandwidth and a location of each of the one or more frequency bands of the subset.

Clause 11. The method of clause 10, wherein the downlink control information (DCI) message is specific to the user equipment (UE).

Clause 12. A method of data transmission, comprising the steps of: determining,
    by a base station, a subset of a plurality of available frequency bands;
    transmitting, by the base station, a configuration message indicating the subset of the plurality of available frequency bands for receiving a radio signal by the base station;
    monitoring, by the base station, the subset of the plurality of the available frequency bands; and
    detecting, by the base station, a radio signal including a random access request, information data, and/or control signaling from a user equipment (UE) in at least one frequency band of the subset of available frequency bands.

Clause 13. The method of clause 12, further comprising:
    measuring a key performance indicators (KPI) in each of the available frequency bands, and determining the subset of the plurality of available frequency bands based on a quality of the KPI indicators.

Clause 14. The method of clause 12, further comprising:
    performing a listen before talk (LBT) operation in each of the available frequency bands, and determining the subset of the plurality of available frequency bands based on a successful result of the in each of the available frequency bands.

Clause 15. The method of clause 12 wherein the configuration message includes an identification specifying bandwidth and location of one or more frequency bands in the subset.

Clause 16. The method of clause 12, wherein the configuration message is transmitted via a Radio Resource Layer (RRC) protocol.

Clause 17. The method of clause 12, wherein the configuration message is transmitted via a user equipment (UE)-specific, dedicated signaling to the UE.

Clause 18. The method of clause 12, wherein the configuration message is transmitted via a common signaling to a group of user equipments (UEs) located in a cell of a wireless network, wherein the common signaling is shared between the group of UEs.

Clause 19. The method of clause 12, wherein the configuration message is transmitted via a downlink control information (DCI) message that includes an identification that specifies bandwidth and location of each of one or more frequency bands of the subset.

Clause 20. The method of clause 19, wherein the DCI message is specific to the user equipment (UE).

Clause 21. A user equipment (UE), comprising:
    a transceiver configured to receive a configuration message indicating one or more frequency bands for transmitting a radio signal; and
    a processor in communication with transceiver and configured to: perform a listen
    before talk (LBT) operation on each frequency band of the one or more frequency bands; and
    determine at least one subset frequency band of the one or more frequency bands;
    wherein the transceiver is further configured to transmit the radio signal in the at least one subset frequency band of the one or more frequency bands.

Clause 22. A base station, comprising:
    a processor configured to determine a subset of one or more frequency bands; and a transceiver in communication with the processor and configured to: transmit a configuration message indicating the subset of the one or more frequency bands;
    monitor the subset of the one or more frequency bands; and
    detect a radio signal including a random access request, information data, and control signaling from a user equipment (UE) in the one or more frequency bands of the subset.

Clause 23. A non-transitory computer-readable medium having program code recorded, the program code comprising:
    code for controlling a user equipment (UE) to which a part of the program code is operational to receive a configuration message indicating one or more frequency bands for transmitting a radio signal; and
    code for controlling the UE to determine a subset of the one or more frequency bands;
    code for controlling the UE to perform a listen before talk (LBT) operation on each frequency band of the subset of the one or more frequency bands; and code for controlling the UE to transmit a radio signal in at least one frequency band of the subset of the one or more frequency bands.

Clause 24. A non-transitory computer-readable medium having program code recorded, the program code comprising:
    code for controlling a base station to which a part of the program code is operational to determine a subset of a plurality of frequency bands for transmitting and/or receiving a radio signal;
    code for controlling the base station to transmit a configuration message indicating the subset of the plurality of frequency bands for receiving a radio signal;
    code for controlling the base station to monitor the subset of the plurality of frequency bands; and

code for controlling the base station to detect a radio signal including a random access request, information data, control signaling from a UE in at least one of the subset of the plurality of frequency bands.

The invention claimed is:

1. A method of data transmission, comprising:
  receiving, by a user equipment (UE), from a base station, a configuration message indicating one or more frequency bands for transmitting a radio signal;
  determining, by the UE, a first bandwidth part (BWP) corresponding to a first frequency band from among the one or more frequency bands;
  performing, by the UE, a first listen before talk (LBT) operation on the first frequency band;
  switching, by the UE, the first BWP corresponding to the first frequency band to a second BWP corresponding to a second frequency band different from the first frequency band in a case that the first LBT operation fails, the second BWP having a first portion for transmitting a random access preamble;
  initiating, by the UE, a random access procedure in the second BWP in a case that the first BWP is switched to the second BWP, the random access procedure including transmitting, by the UE, to the base station, the random access preamble in the first portion of the second BWP; and
  performing, by the UE, a second LBT operation prior to transmitting on the second BWP in which the random access procedure has been completed,
  wherein the step of the switching, by the UE, the first BWP corresponding to the first frequency band to the second BWP corresponding to the second frequency band different from the first frequency band in a case that the first LBT operation fails comprises a step of determining whether the second BWP corresponding to the second frequency band has the first portion for transmitting the random access preamble.

2. The method of claim 1, wherein the configuration message is received via a Radio Resource Control (RRC) protocol.

3. The method of claim 1, wherein the configuration message is received via a dedicated UE specific signaling.

4. The method of claim 1, wherein the UE is positioned in a cell of a wireless network and the configuration message is received via a common signaling shared by the UE and one or more other UEs in the cell of the wireless network.

5. A user equipment (UE), comprising:
  a transceiver configured to receive, from a base station, a configuration message indicating one or more frequency bands for transmitting a radio signal; and
  a processor in communication with the transceiver and configured to:
    determine a first bandwidth part (BWP) corresponding to a first frequency band from among the one or more frequency bands;
    perform a first listen before talk (LBT) operation on the first frequency band;
    determine whether a second BWP corresponding to a second frequency band different from the first frequency band has a first portion for transmitting a random access preamble; and
    switch the first BWP corresponding to the first frequency band to the second BWP corresponding to the second frequency band in a case that the first LBT operation fails, based on a determination that the second BWP has the first portion for transmitting the random access preamble,
  wherein the transceiver is further configured to initiate a random access procedure in the second BWP in a case that the first BWP is switched to the second BWP, the initiating the random access procedure in the second BWP including transmitting, to the base station, the random access preamble in the first portion of the second BWP, and
  wherein the transceiver is further configured to perform a second LBT operation prior to transmitting on the second BWP in which the random access procedure has been completed.

* * * * *